US011875738B2

(12) United States Patent
Kim et al.

(10) Patent No.: US 11,875,738 B2
(45) Date of Patent: Jan. 16, 2024

(54) DRIVING CIRCUIT INCLUDING A FIRST AND SECOND DRIVING MODE AND METHOD OF OPERATING THE SAME

(71) Applicant: SAMSUNG ELECTRONICS CO., LTD., Suwon-si (KR)

(72) Inventors: Jihoon Kim, Busan (KR); Yongsoo Lee, Busan (KR); Kyunghoon Chung, Hwaseong-si (KR); Minje Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/691,654

(22) Filed: Mar. 10, 2022

(65) Prior Publication Data

US 2023/0047827 A1 Feb. 16, 2023

(30) Foreign Application Priority Data

Aug. 10, 2021 (KR) ........................ 10-2021-0105184

(51) Int. Cl.
*G09G 3/3225* (2016.01)

(52) U.S. Cl.
CPC ... *G09G 3/3225* (2013.01); *G09G 2310/0291* (2013.01); *G09G 2320/0276* (2013.01); *G09G 2320/0673* (2013.01); *G09G 2330/021* (2013.01)

(58) Field of Classification Search
None
See application file for complete search history.

(56) References Cited

U.S. PATENT DOCUMENTS 6,664,851 B1 12/2003 Pihlstrom et al.
6,731,170 B2 5/2004 Juang
7,940,243 B2 5/2011 Woo et al.
8,476,971 B2 7/2013 Peng et al.
8,476,977 B2 7/2013 Nishimura
8,558,826 B2 10/2013 Ito et al.
2011/0050749 A1* 3/2011 Park .......................... G09G 3/20 345/76
2014/0184657 A1* 7/2014 Lee ....................... G09G 3/3208 345/690
2016/0035264 A1* 2/2016 Fujii .................... G09G 3/3233 345/691

(Continued)

*Primary Examiner* — Amr A Awad
*Assistant Examiner* — Donna V Bocar
(74) *Attorney, Agent, or Firm* — Muir Patent Law, PLLC

(57) ABSTRACT

A display driver integrated circuit includes a gamma circuit, a control circuit, and an output buffer circuit. The gamma circuit generates a plurality of gamma voltages based on gamma control information, a first gamma power supply voltage and a second gamma power supply voltage. The control circuit calculates a gamma limit value based on panel brightness information, voltage levels of the first and second gamma power supply voltages and the number of the plurality of gamma voltages. The control circuit generates a mode determination signal. The output buffer circuit includes a plurality of buffer circuits. Each of the plurality of buffer circuits includes an input stage and the input stage includes first transistors and second transistors. In a first driving mode, each of the plurality of buffer circuits turns off the first transistors and turns on the second transistors included in the input stage.

20 Claims, 23 Drawing Sheets

(56) References Cited

U.S. PATENT DOCUMENTS

| | | | | |
|---|---|---|---|---|
| 2016/0240155 | A1 | 8/2016 | Yang et al. | |
| 2016/0365019 | A1* | 12/2016 | Lee | G09G 3/3688 |
| 2017/0076656 | A1* | 3/2017 | Bang | G09G 3/2092 |
| 2019/0087620 | A1* | 3/2019 | Kim | G06V 40/1318 |

* cited by examiner

DRIVING CIRCUIT INCLUDING A FIRST AND SECOND DRIVING MODE AND METHOD OF OPERATING THE SAME

CROSS-REFERENCE TO RELATED APPLICATION

This U.S. non-provisional application claims priority under 35 U.S.C. § 119 to Korean Patent Application No. 10-2021-0105184, filed on Aug. 10, 2021, in the Korean Intellectual Property Office (KIPO), the disclosure of which is incorporated by reference herein in its entirety.

BACKGROUND

1. Field

Example embodiments relate generally to semiconductor integrated circuits, and more particularly to a display driver integrated circuit and a method of operating the display driver integrated circuit.

2. Description of the Related Art

A display system employing an OLED display device may be driven at a high speed of 120 Hz or higher to provide excellent image quality without interruption. However, as a display system is driven at higher frequencies, power consumption by the display system may increase. In particular, power consumption in a display driver integrated circuit included in the display system may account for a high proportion of a total power consumption of the display system.

SUMMARY

According to an embodiment, a display driver integrated circuit includes a gamma circuit, a control circuit, and an output buffer circuit. The gamma circuit generates a plurality of gamma voltages based on gamma control information, a first gamma power supply voltage and a second gamma power supply voltage. The control circuit calculates a gamma limit value based on panel brightness information, voltage levels of the first and second gamma power supply voltages and a number of the plurality of gamma voltages and compares the gamma limit value with a mode determination reference value to generate a mode determination signal representing one of a first driving mode and a second driving mode. The output buffer circuit includes a plurality of buffer circuits that provide analog image signals to a plurality of pixels included in a display panel. Each of the plurality of buffer circuits includes an input stage, an amplification stage and an output stage, and the input stage includes first transistors having a first type and second transistors having a second type. In the first driving mode, each of the plurality of buffer circuits turns off the first transistors included in the input stage and turns on the second transistors included in the input stage. In the second driving mode, each of the plurality of buffer circuits turns on both of the first and second transistors included in the input stage.

According to an embodiment, in a method of operating a display driver integrated circuit, a plurality of gamma voltages are generated based on gamma control information, a first gamma power supply voltage and a second gamma power supply voltage. A gamma limit value is calculated based on panel brightness information, voltage levels of the first and second gamma power voltages and a number of the plurality of gamma voltages. The gamma limit value is compared with a mode determination reference value to generate a mode determination signal representing one of a first driving mode and a second driving mode. Each of a plurality of buffer circuits is turns off first transistors included in an input stage and turns on second transistors included in the input stage in the first driving mode. Each of the plurality of buffer circuits includes the input stage, an amplification stage and an output stage, and the input stage includes the first transistors having a first type and the second transistors having a second type. Each of the plurality of buffer circuits turns on both of the first and second transistors included in the input stage in the second driving mode.

According to an embodiment, a display driver integrated circuit includes a gamma circuit, a control circuit, and an output buffer circuit. The gamma circuit generates a plurality of gamma voltages based on gamma control information, a first gamma power supply voltage and a second gamma power supply voltage. The control circuit calculates a gamma limit value based on panel brightness information, voltage levels of the first and second gamma power supply voltages and the number of the plurality of gamma voltages, and compares the gamma limit value with a mode determination reference value to generate a mode determination signal representing one of a first driving mode and a second driving mode. The output buffer circuit includes a plurality of buffer circuits that provide analog image signals to a plurality of pixels included in a display panel. Each of the plurality of buffer circuits includes an input stage, an amplification stage and an output stage, and the input stage includes first transistors having a first type and second transistors having a second type. The input stage includes a first input unit, a second input unit, a first bias unit, a second bias unit and a mode change unit. The first input unit includes PMOS transistors. The second input unit includes NMOS transistors. The first bias unit includes a first bias transistor that supplies a first bias current to the first input unit. The second bias unit includes a second bias transistor that supplies a second bias current to the second input unit. The mode change unit includes at least one of a first mode change transistor connected to a gate of the first bias transistor and a second mode transistor connected to a gate of the second bias transistor, and in the first driving mode, blocks supply of one of the first bias current and the second bias current. In the first driving mode, each of the plurality of buffer circuits turns off one of the first and second mode change transistors to turn off one of the first and second input units and turn on the other of the first and second input units. In the second driving mode, each of the plurality of buffer circuits turns on at least one of the first and second mode change transistors to turn on both of the first and second input units.

BRIEF DESCRIPTION OF THE DRAWINGS

Features will become apparent to those of skill in the art by describing in detail example embodiments with reference to the attached drawings in which:

FIG. 4 is a block diagram illustrating an example embodiment of the control circuit in

FIG. 1.

DETAILED DESCRIPTION

Figure 1:
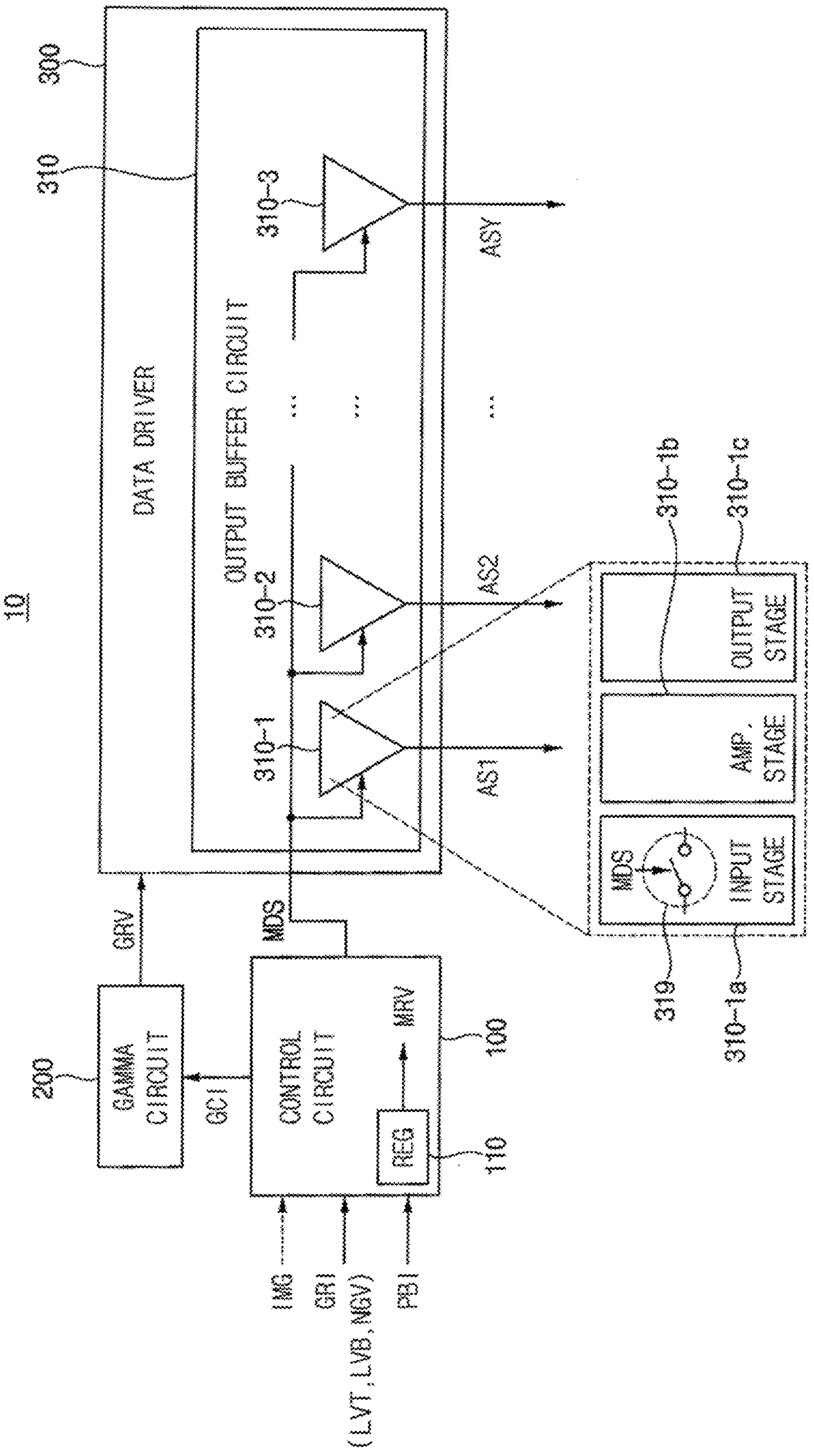
FIG. 1 is a block diagram illustrating a display driver integrated circuit according to example embodiments.

FIG. 1 is a block diagram illustrating a display driver integrated circuit according to example embodiments.

Referring to FIG. 1, a display driver integrated circuit 10 may include a control circuit 100, a gamma circuit 200, and a data driver 300. The data driver may include an output buffer circuit 310.

As will be described below with reference to FIG. 24, the display driver integrated circuit 10 may be connected to a display panel. The display driver integrated circuit 10 may generate analog image signals AS1, AS2, and ASY based on input image data IMG that are digital signals, and output the generated analog image signals AS1, AS2, and ASY to the display panel. The display panel may display frame images based on the input image data IMG.

The gamma circuit 200 may generate a plurality of gamma voltages GRV based on gamma control information GCI, a first gamma power supply voltage, and a second gamma power supply voltage. For example, the gamma circuit 200 may receive the gamma control information GCI from the control circuit 100, generate a plurality of gamma intermediate voltages using the first and second gamma power supply voltages, and select a portion of the plurality of gamma intermediate voltages based on the gamma control information GCI to generate the plurality of gamma voltages GRV.

The control circuit 100 may calculate a gamma limit value based on panel brightness information PBI, voltage levels LVT, LVB of the first and second gamma power supply voltages, and the number NGV of the plurality of gamma voltages GRV, and compare the gamma limit value with a mode determination reference value MRV to generate a mode determination signal MDS representing one of a first driving mode and a second driving mode.

The control circuit 100 may generate the gamma control information GCI based on the panel brightness information PBI. For example, the control circuit 100 may receive the panel brightness information PBI and gamma reference information GRI from an external host device, or receive the panel brightness information from the external host device and receive the gamma reference information GM from an internal one time programmable (OTP) memory device (not shown). The gamma reference information GRI may include the voltage levels LVT, LVB of the first and second gamma power supply voltages and the number NGV of the plurality of gamma voltages GRV. The control circuit 100 may generate the mode determination signal MDS, generated in units of frames in which the display panel operates, based on the panel brightness information PBI and the gamma reference information GM.

The display driver integrated circuit 10 may drive the display panel in different driving modes. For example, the display driver integrated circuit 10 may drive the display panel in one of the first driving mode and the second driving mode. The first driving mode may represent a mode in which the display driver integrated circuit 10 drives the display panel in a range smaller than a predetermined maximum drive range, and the second driving mode may represent a mode in which the display driver integrated circuit 10 drives the display panel in the maximum drive range. The maximum drive range will be described below with reference to FIG. 3.

The output buffer circuit 310 may include a plurality of buffer circuits 310-1, 310-2, and 310-3. Each of the plurality of buffer circuits 310-1, 310-2, and 310-3 may be a rail-to-rail amplifier implemented with a complementary metal-oxide semiconductor (CMOS) circuit, and include an input stage, an amplification stage, and an output stage. Each of the input stage, the amplification stage, and the output stage may include first transistors having a first type and second transistors having a second type. For example, the buffer circuit 310-1 may include an input stage 310-1*a*, an amplification stage 310-1*b*, and an output stage 310-1*c*.

The display driver integrated circuit 10 may turn off the first transistors and turn on the second transistors included in the input stage of each of the plurality of buffer circuits 310-1, 310-2, and 310-3, in the first driving mode. The display driver integrated circuit 10 may turn on both of the first and second transistors included in the input stage of each of the plurality of buffer circuits 310-1, 310-2, and 310-3, in the second driving mode. To this end, a mode change unit may be included in the input stage in each of the plurality of buffer circuits 310-1, 310-2, and 310-3. The plurality of buffer circuits 310-1, 310-2, and 310-3 may be implemented in various embodiments according to circuit configurations of the mode change unit. Example embodiments of the plurality of buffer circuits 310-1, 310-2, and 310-3 will be described below with reference to FIGS. 7, 12, and 16.

In some example embodiments, the data driver 300 may further include a shift register unit, a data latch unit, and a digital-to-analog converter. The shift register unit may output a plurality of clock signals to the data latch unit, and the data latch unit may sequentially store input image data IMG corresponding to one horizontal line of the display panel in response to the plurality of clock signals. The digital-to-analog converter may output gamma voltages corresponding to the input image data IMG output from the data latch unit among the plurality of gamma voltages GRV. The output buffer circuit 310 may buffer the gamma voltages and output the buffered gamma voltages as the analog image signals AS1, AS2, and ASY.

In some example embodiments, the panel brightness information PBI may be generated by adjusting a grayscale value externally displayed by the display panel, and may be generated based on an input by a user of the display device including the display panel. An example embodiment of generating the panel brightness information PBI will be described below with reference to FIG. 5.

In some example embodiments, the gamma limit value may represent a voltage level of a gamma voltage having the highest or the lowest voltage level among the plurality of gamma voltages GRV generated by the gamma circuit 200. The gamma limit value may be determined by the user of the display device controlling a brightness adjustment unit, which will be described below with reference to FIG. 5.

In some example embodiments, the control circuit 100 may use the mode determination reference value MRV stored in a register 110 in a process of generating the mode determination signal MDS. The mode determination reference value MRV may be determined based on a range in which the plurality of buffer circuits 310-1, 310-2, and 310-3 can buffer the gamma voltages and output the gamma voltages without distortion when the first transistors included in the input stage of each of the plurality of buffer circuits 310-1, 310-2, and 310-3 are turned off in the first driving mode.

As described above, the display driver integrated circuit 10 may operate in different driving modes, and thus turn off a portion of the transistors included in input stage of each of the plurality of buffer circuits 310-1, 310-2, and 310-3 when it is not intended to drive the display panel to maximum. Accordingly, power consumption in the display driver integrated circuit 10 may be adaptively reduced.

The display driver integrated circuit 10 may generate the mode determination signal MDS in a digital circuit. The control circuit 100, the shift register unit, and the data latch unit may correspond to the digital circuit. The gamma circuit 200, the digital-to-analog converter, and the output buffer circuit 310 may correspond to an analog circuit. Accordingly, power consumption in the display driver integrated circuit 10 may be effectively reduced regardless of whether the analog circuit of the display device is changed according to a hardware specification stated by a manufacturer of the display device.

Figure 2:
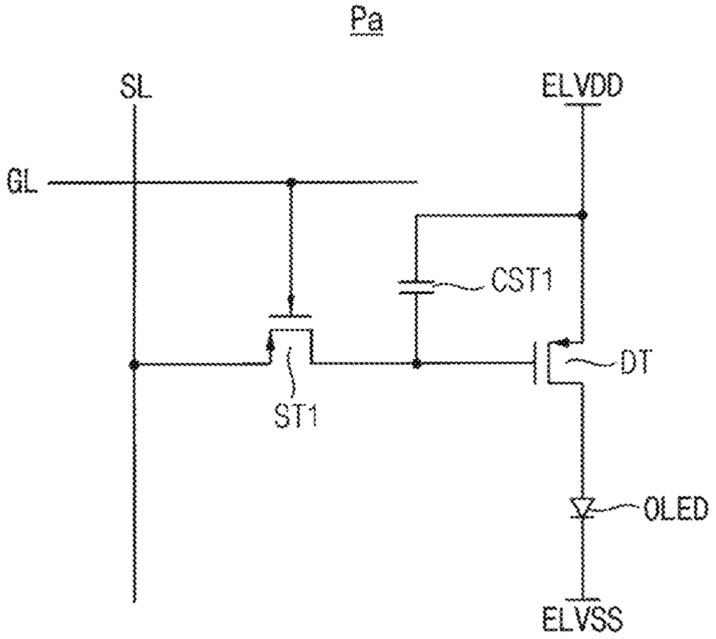
FIG. 2 is a circuit diagram illustrating an example embodiment of a pixel included in a display panel driven by the display driver integrated circuit of FIG. 1.

FIG. 2 is a circuit diagram illustrating an example embodiment of a pixel included in a display panel driven by the display driver integrated circuit of FIG. 1.

Referring to FIG. 2, a pixel Pa may include a switching transistor ST1, a storage capacitor CST1, a drive transistor DT, and an organic light emitting diode OLED.

The display panel driven by the display driver integrated circuit may include a plurality of pixels, and the pixel Pa may be included in the plurality of pixels.

The switching transistor ST1 may have a first terminal connected to a source line SL or a data line, a second terminal connected to the storage capacitor CST1, and a gate terminal connected to a gate line GL or a scan line. The switching transistor ST1 may transmit analog data provided through the source line SL to the storage capacitor CST1 in response to a gate drive signal applied through the gate line GL.

The storage capacitor CST1 may have a first electrode connected to a high power supply voltage ELVDD and a second electrode connected to a gate terminal of the drive transistor DT. The storage capacitor CST1 may store the analog data transmitted through the switching transistor ST1.

The drive transistor DT may have a first terminal connected to the high power supply voltage ELVDD, a second terminal connected to the organic light emitting diode OLED, and a gate terminal connected to the storage capacitor CST1. The drive transistor DT may be turned on or off according to data stored in the storage capacitor CST1.

The organic light emitting diode OLED may have an anode electrode connected to the drive transistor DT and a cathode electrode connected to a low power supply voltage ELVSS. The organic light emitting diode OLED may emit light based on a current flowing from the high power supply voltage ELVDD to the low power supply voltage ELVSS while the drive transistor DT is turned on. This simple structure of the pixel Pa, e.g., 2T1C structure of two transistors ST1 and DT and one capacitor CST1, may be more suitable for increasing a size of a display device.

The pixel Pa of FIG. 2 is an example of an electroluminescent (EL) pixel, but the structure of the pixel Pa may be varied, and the EL pixel having various configurations may be driven by the display driver integrated circuit according to example embodiments. Hereinafter, it is assumed that the display driver integrated circuit drives the pixel Pa of FIG. 2 with reference to FIGS. 3 to 16. For the sake of explanation, shape of gamma curves in FIGS. 8, 9, and 13 may correspond to a case in which the switching transistor ST1 and the drive transistor DT included in the pixel Pa are implemented as p-type metal oxide semiconductor (PMOS) transistors.

Figure 3:
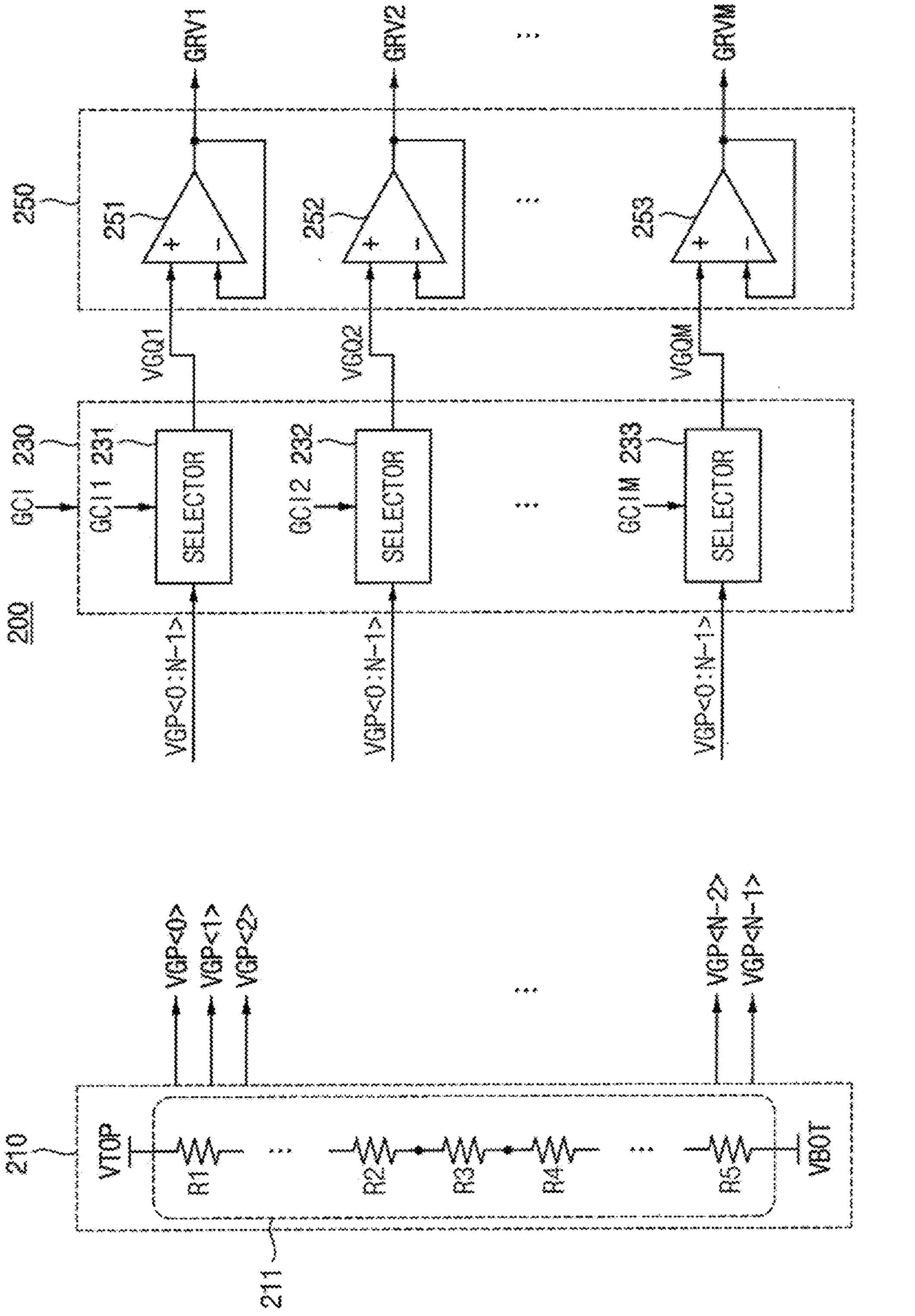
FIG. 3 is a block diagram illustrating an example embodiment of a gamma circuit included in the display driver integrated circuit of FIG. 1.

FIG. 3 is a block diagram illustrating an example embodiment of a gamma circuit included in the display driver integrated circuit of FIG. 1.

Referring to FIGS. 1 and 3, the gamma circuit 200 may include a gamma intermediate voltage generation circuit 210, a gamma selection circuit 230, and a gamma voltage providing circuit 250.

The gamma intermediate voltage generation circuit 210 may include a resistor string 211 including a plurality of resistors R1, R2, R3, R4, and R5.

The gamma selection circuit 230 may include a plurality of selectors 231, 232, and 233.

The gamma voltage providing circuit 250 may include a plurality of voltage buffers 251, 252 and 253.

As described above with reference to FIG. 1, the gamma circuit 200 may use the first and second gamma power supply voltages VTOP and VBOT to generate a plurality of gamma intermediate voltages VGP<0>, VGP<1>, VGP<2>, VGP<N−2>, VGP<N−1>, and select a portion, e.g., VGQ1, VGQ2, and VGQM, from among the plurality of gamma intermediate voltages VGP<0> to VGP<N−1> based on the gamma control information GCI to generate gamma voltages GRV1, GRV2, and GRVM (where N is a natural number greater than two, and M is a natural number less than or equal to N).

In some example embodiments, the maximum drive range of the display panel may correspond to a case in which the display panel is driven by using gamma intermediate voltages that include a first gamma intermediate voltage VGP<0> and a second gamma intermediate voltage VGP<N−1> as the plurality of gamma voltages, where the first gamma intermediate voltage VGP<0> may have the highest voltage level from among the plurality of gamma intermediate voltages VGP<0> to VGP<N−1>, and the second gamma intermediate voltage VGP<N−1> may have the lowest voltage level from among the plurality of gamma intermediate voltages VGP<0> to VGP<N−1>.

In some example embodiments, the gamma selection circuit 230 may receive the gamma control information GCI including first to M-th selection control signals GCI1, GCI2, and GCIM. Each of a plurality of selectors 231, 232, and 233 may select one of the plurality of gamma intermediate voltages VGP<0> to VGP<N−1> based on a corresponding selection control signal among the first to M-th selection control signals GCI1, GCI2, and GCIM. For example, the selector 231 may select one of the plurality of gamma intermediate voltages VGP<0> to VGP<N−1> based on the selection control signal GCI1 to output a selected gamma intermediate voltage VGQ1, the selector 232 may select one of the plurality of gamma intermediate voltages VGP<0> to VGP<N−1> based on the selection control signal GCI2 to output a selected gamma intermediate voltage VGQ2, and the selector 233 may select one of the plurality of gamma intermediate voltages VGP<0> to VGP<N−1> based on the selection control signal GCIM to output a selected gamma intermediate voltage VGQM.

In some example embodiments, the gamma voltage providing circuit 250 may buffer the selected gamma intermediate voltages VGQ1, VGQ2, and VGQM to respectively output the plurality of gamma voltages GRV1, GRV2, and GRVM.

In FIG. 3, the gamma circuit 200 may select M gamma intermediate voltages from among N gamma intermediate voltages to generate a plurality of gamma voltages GRV1, GRV2, and GRVM. In some example embodiments, the number of the plurality of gamma intermediate voltages VGP<0> to VGP<N−1> may correspond to a fixed value, but the number of the plurality of gamma voltages GRV1, GRV2, and GRVM may be changed, e.g., based on the gamma control information GCI.

As described above with reference to FIG. 1, the gamma control information GCI may be generated based on the panel brightness information PBI, and the panel brightness information PBI may be generated based on the user input of the display device including the display panel. In an example, it may be assumed that the number of the gamma intermediate voltages corresponds to '1024', the gamma intermediate voltage VGP<0> represents the lowest grayscale value, e.g., darkest, and the gamma intermediate voltage VGP<1023> represents the highest grayscale value, e.g., brightest. When the user of the display device darkens the display panel, the plurality of gamma voltages GRV1, GRV2, and GRVM may be selected as, e.g., gamma intermediate voltages VGP<0> to VGP<767>. In this case, N corresponds to '1024', and M corresponds to '768'. When the user of the display device brightens the display panel, the plurality of gamma voltages GRV1, GRV2, and GRVM may be selected as, e.g., gamma intermediate voltages VGP<256> to VGP<1023>. In this case, N corresponds to '1024', and M corresponds to '768'.

In FIG. 3, the plurality of gamma voltages GRV1, GRV2, and GRVM correspond to final output signals output from the gamma circuit 200. However, the gamma circuit 200 is illustrated briefly for convenience of description, the gamma circuit 200 may further include a plurality of resistor strings included in each of an input stage of the gamma selection circuit 230 and an output stage of the gamma voltage providing circuit 250, in addition to the resistor string 211 included in the gamma intermediate voltage generation circuit 210.

Figure 4:
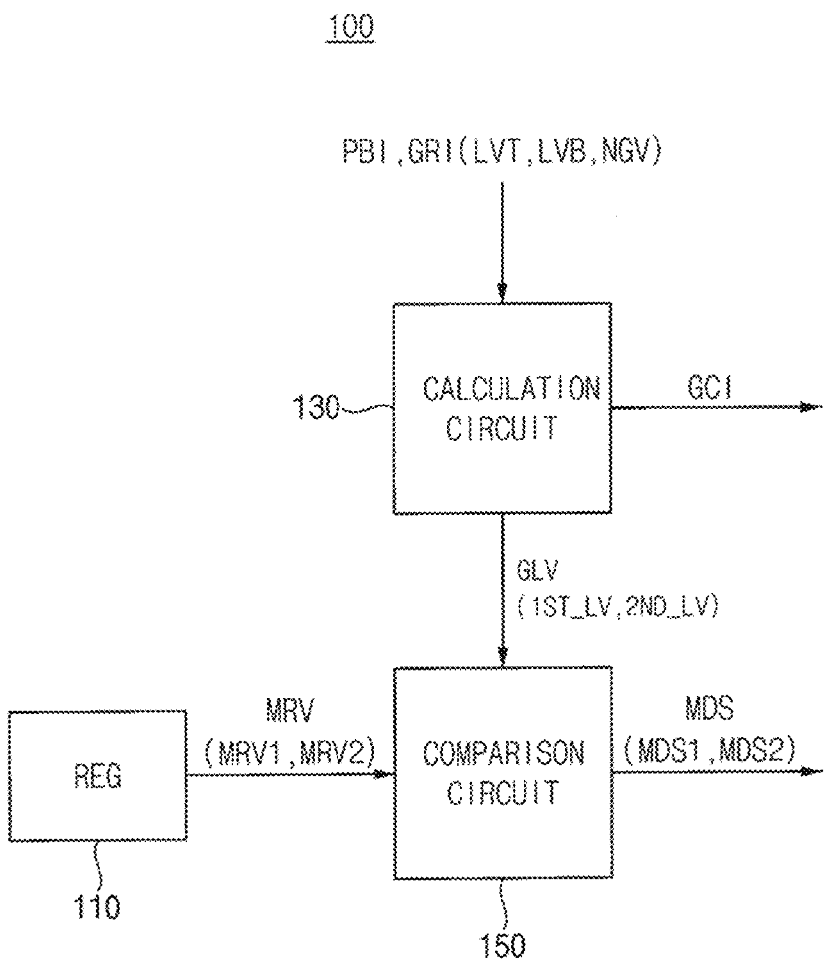

FIG. 4 is a block diagram illustrating an example embodiment of the control circuit in FIG. 1.

Referring to FIGS. 1 and 4, the control circuit 100 may include a register 110, a calculation circuit 130, and a comparison circuit 150.

The register 110 may store a mode determination reference value MRV used in determining one of the first driving mode and the second driving mode (or generating the mode decision signal MDS).

In some example embodiments, the mode determination reference value MRV may include at least one of a first mode determination reference value MRV1 and a second mode determination reference value MRV2 according to circuit configurations of the mode change unit described above with reference to FIG. 1. For example, the first mode determination reference value MRV1 may be a relatively lower voltage, and the second mode determination reference value MRV2 may be a relatively higher voltage, e.g., MRV1<MRV2.

The calculation circuit 130 may receive the panel brightness information PBI and the gamma reference information GRI including the voltage levels LVT, LVB of the first and second gamma power voltages and the number NGV of the plurality of gamma voltages GRV, and calculate the gamma limit value GLV based on the panel brightness information PBI and the gamma reference information GRI.

In some example embodiments, the calculation circuit 130 may determine a first ratio using the panel brightness information PBI and the number NGV of the plurality of gamma voltages GRV, and calculate the gamma limit value GLV based on the first ratio.

In some example embodiments, the gamma limit value GLV may be a value between the first gamma power supply voltage and the second gamma power supply voltage, and include at least one of the first limit value 1ST_LV and the second limit value 2ND_LV according to circuit configurations of the mode change unit described above with reference to FIG. 1. For example, the first limit value 1ST_LV may correspond to the first mode determination reference value MRV1, and the second limit value 2ND_LV may correspond to the second mode determination reference value MRV2.

The comparison circuit 150 may compare the gamma limit value GLV with the mode determination reference value MRV to generate the mode determination signal MDS. In some example embodiments, the first limit value 1ST_LV may be compared with the first mode determination reference value MRV1, and the second limit value 2ND_LV may be compared with the second mode determination reference value MRV2.

Figure 5:
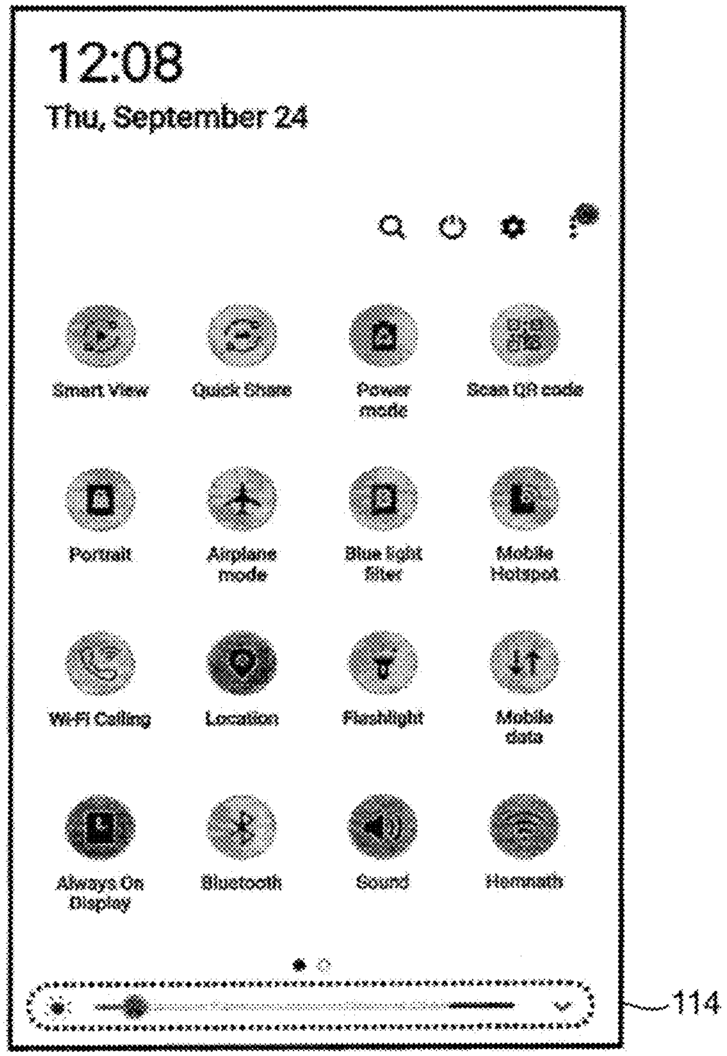
FIG. 5 is a diagram for describing the panel brightness information in FIG. 1.

FIG. 5 is a diagram for describing the panel brightness information in FIG. 1.

FIG. 5 illustrates a display screen displayed in a display device driven by the display driver integrated circuit 10 in FIG. 1. The display device may be a smart phone, a personal digital assistant (PDA), a portable multimedia player (PMP), or the like. When a user of the display device touches the display screen and swipes down from the top to the bottom, a status bar as illustrated in FIG. 5 may be displayed.

Referring to FIG. 5, the user of the display device may adjust brightness of the display screen by controlling an adjustment point of the brightness adjustment unit 114 of a status bar displayed on a display screen during an operation of the display panel.

In some example embodiments, when the user of the display device controls the adjustment point to the left, the brightness of the display screen may become less or darker, and when the user of the display device controls the adjustment point to the right, the brightness of the display screen may become more or brighter.

In some example embodiments, the panel brightness information PBI in FIG. 1 may represent the brightness of the display screen adjusted by the operation of the brightness adjustment unit 114 as a value within a predetermined range. For example, the panel brightness information PBI may represent a value of zero or more and 'N' or less, e.g., 'N/4', where N is the number of gamma intermediate voltages VGP<0> to VGP<N−1> generated by the gamma intermediate voltage generation circuit 210 in FIG. 3. For example, when the user of the display device controls the adjustment point to the left, the panel brightness information may represent a value close to zero, and when the user controls the adjustment point to the right, the panel brightness information may represent a value close to 'N'.

Figure 6:
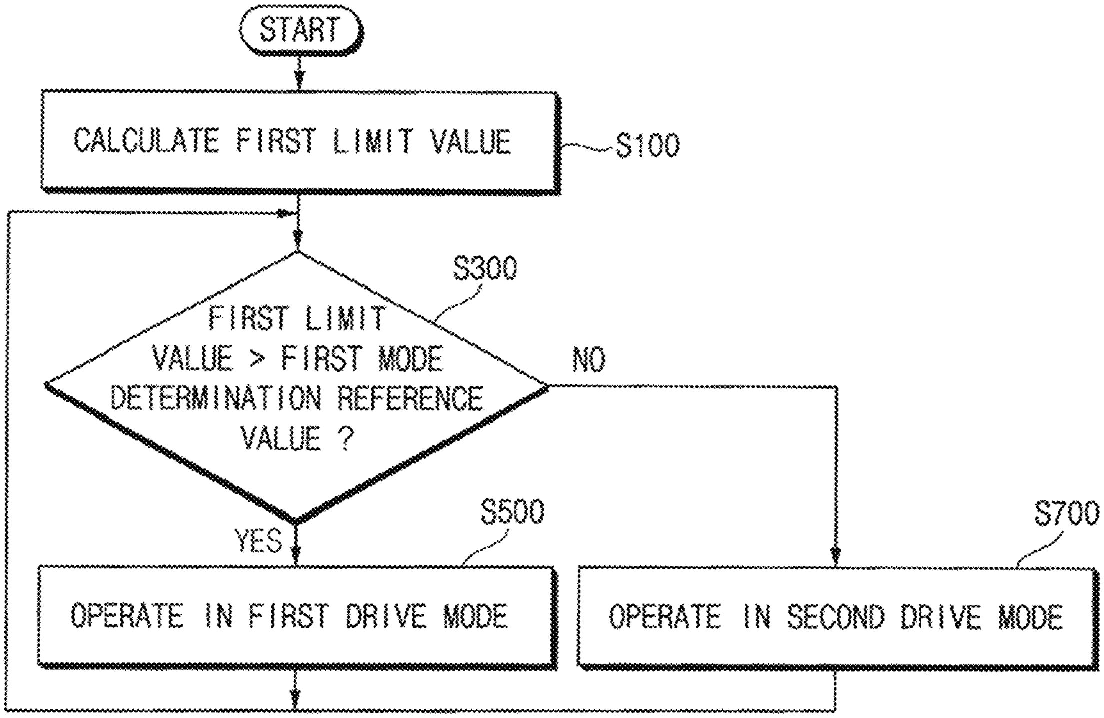
FIG. 6 is a flowchart illustrating an example of operations of the control circuit and the output buffer circuit in FIG. 1.
Figure 7:
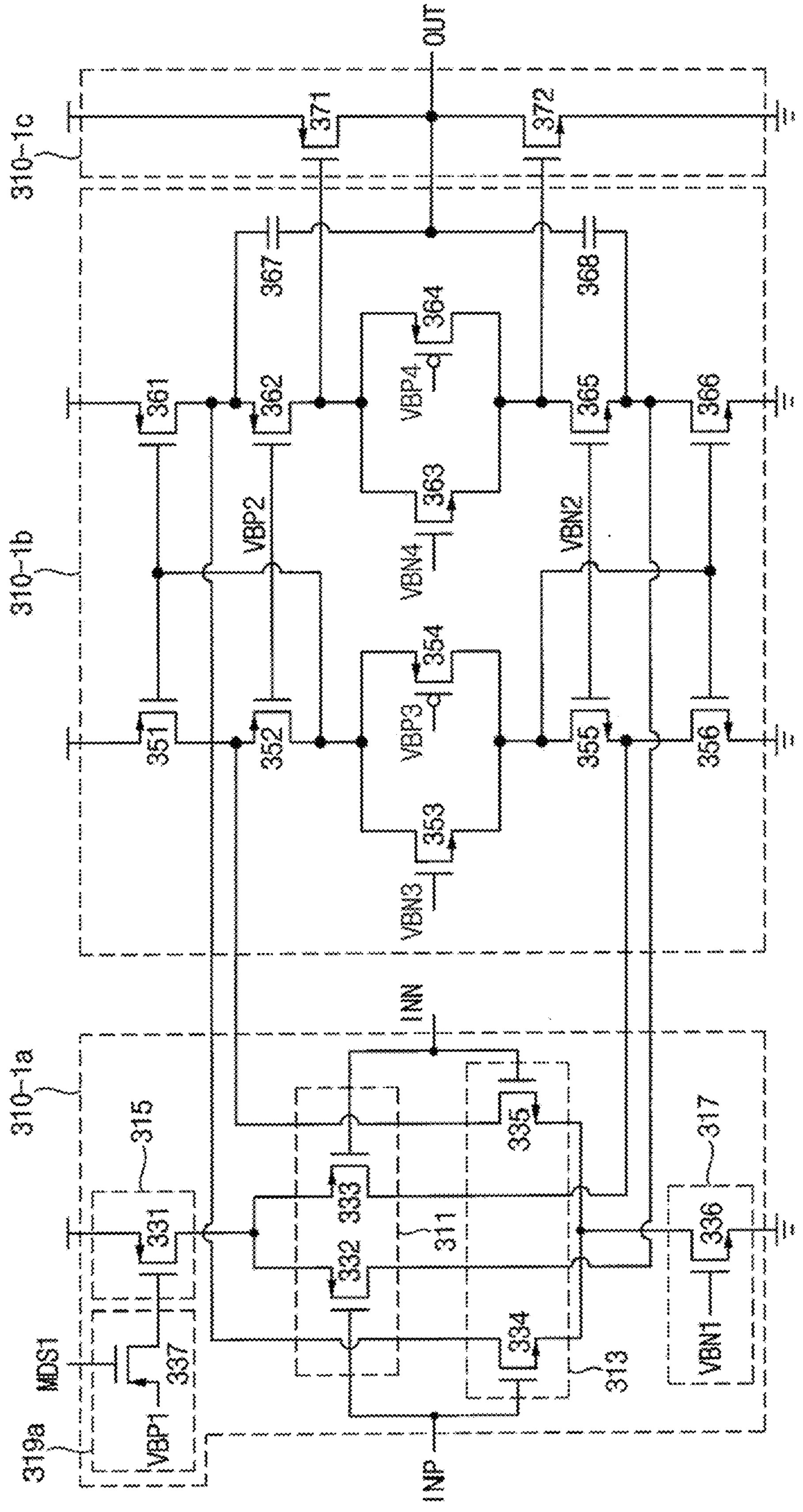
FIG. 7 is a circuit diagram illustrating an example embodiment of a buffer circuit included in the output buffer circuit that performs operations of FIG. 6.

FIG. 6 is a flowchart illustrating an example of operations of the control circuit and the output buffer circuit in FIG. 1. FIG. 7 is a circuit diagram illustrating an example embodiment of a buffer circuit included in the output buffer circuit that performs operations of FIG. 6.

Referring to FIGS. 1, 6, and 7, FIG. 7 illustrates an example of the buffer circuit 310-1 among the plurality of buffer circuits 310-1, 310-2, and 310-3. FIG. 6 illustrates operations when the plurality of buffer circuits 310-1, 310-2, and 310-3 are configured as illustrated in FIG. 7.

Referring to FIG. 7, the buffer circuit 310-1 may include an input stage 310-1*a*, an amplification stage 310-1*b*, and an output stage 310-1*c*.

The input stage 310-1*a* may include a first bias unit 315, a second bias unit 317, a first input unit 311, a second input unit 313, and a mode change unit 319*a*.

The first bias unit 315 may include a PMOS transistor 331. The second bias unit 317 may include an n-type metal oxide semiconductor (NMOS) transistor 336. The first input unit 311 may include PMOS transistors 332 and 333. The second input unit 313 may include NMOS transistors 334 and 335. The mode change unit 319*a* may include a PMOS transistor (or a first mode change transistor) 337.

The first bias unit 315 and the second bias unit 317 may be connected between a power supply voltage and a ground voltage to supply a bias current to the first input unit 311 and the second input unit 313, respectively. The first input unit 311 and the second input unit 313 may generate currents corresponding to differences between input signals INP and INN, respectively. The input signals INP and INN may correspond to gamma voltages selected from among the plurality of gamma voltages GRV generated by the gamma circuit 200 in FIG. 1.

In some example embodiments, bias signals VBP1 and VBN1 may be applied to gates of the PMOS transistor 331 and the NMOS transistor 336, respectively. In this case, the mode change unit 319*a* is connected between the gate of the PMOS transistor 331 and an input line to which the bias signal VBP1 is applied, and thus a timing at which the bias signal VBP1 is applied to the gate of the PMOS transistor 331 may be controlled.

The amplification stage 310-1*b* may include PMOS transistors 351, 352, 354, 361, 362, and 364, NMOS transistors 353, 355, 356, 363, 365, and 366, and capacitors 367 and 368.

In some example embodiments, the PMOS transistors 351, 352, 361, and 362 may form a first current mirror, and the NMOS transistors 355, 356, 365, and 366 may form a second current mirror.

In some example embodiments, bias signals VBP3, VBP4, VBN3, and VBN4 may be applied to gates of the PMOS transistors 354 and 364 and the NMOS transistors 353 and 363, respectively. The PMOS transistor 354 and the NMOS transistor 353, and the PMOS transistor 364 and the NMOS transistor 363 may operate as a floating current source.

In some example embodiments, each of the PMOS transistors 351, 352, 354, 361, 362, and 364 and the NMOS transistors 353, 355, 356, 363, 365, and 366 may be connected in series between the power supply voltage and the ground voltage to generate voltages corresponding to currents supplied from the input stage 310-1*a*.

In some example embodiments, the capacitors 367 and 368 may perform a function of stabilizing frequency characteristics of voltages generated in the amplification stage 310-1*b*.

The output stage 310-1*c* may include a PMOS transistor 371 and an NMOS transistor 372. The PMOS transistor 371 and the NMOS transistor may generate currents corresponding to voltages supplied from the amplification stage 310-1*b* as an output signal OUT.

Referring back to FIGS. 1 and 6, the control circuit 100 may calculate the gamma limit value including the first limit value based on the panel brightness information PBI, the voltage levels LVT, LVB of the first and second gamma power supply voltages, and the number NGV of the plurality of gamma voltages (S100).

In some example embodiments, the gamma limit value may include the first limit value when the mode change unit 319*a* is connected between the gate of the PMOS transistor 331 and the input line to which the bias signal VBP1 is applied. The first limit value may represent a voltage level of a gamma voltage having the lowest voltage level among a plurality of gamma voltages GRV generated in the gamma circuit 200 by a user of the display device controlling an adjustment point of the brightness adjustment unit in FIG. 3.

The first limit value may be calculated as a value between the first gamma power supply voltage and the second power supply voltage based on a first ratio, which is determined using the panel brightness information PBI and the number NGV of the plurality of gamma voltages. In some example embodiments, the first limit value may be calculated by the following Equation 1.

$$1ST\_LV = VTOP - (VTOP - VBOT) * (M/N) \quad \text{[Equation 1]}$$

In Equation 1, 1ST_LV is the first limit value, VTOP is the first gamma power supply voltage, VBOT is the second gamma power supply voltage, N is the number of the plurality of gamma intermediate voltages, and M corresponds to a value represented by the panel brightness information PBI. In this case, N may be equal to '$2^{Y}$', where Y is a value greater than the number of bits representing the input image data IMG in FIG. 1.

The control circuit 100 may compare the gamma limit value with the mode determination reference value to generate the mode determination signal MDS representing one of the first driving mode and the second driving mode (S300).

In some example embodiments, the mode determination reference value may include the first mode determination reference value when the mode change unit 319*a* is connected between the gate of the PMOS transistor 331 and the input line to which the bias signal VBP1 is applied.

Figure 8:
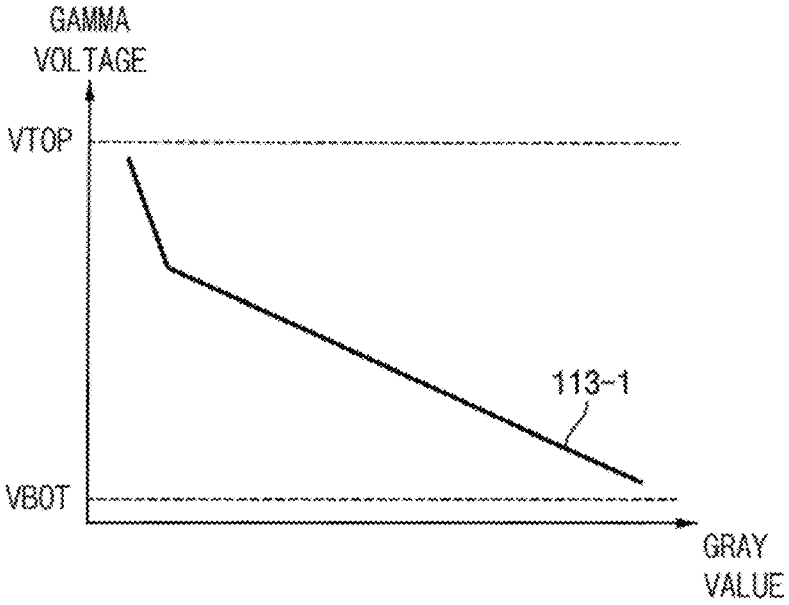
FIGS. 8 and 9 are diagrams for describing the generating a mode determination signal in FIG. 6.
Figure 9:
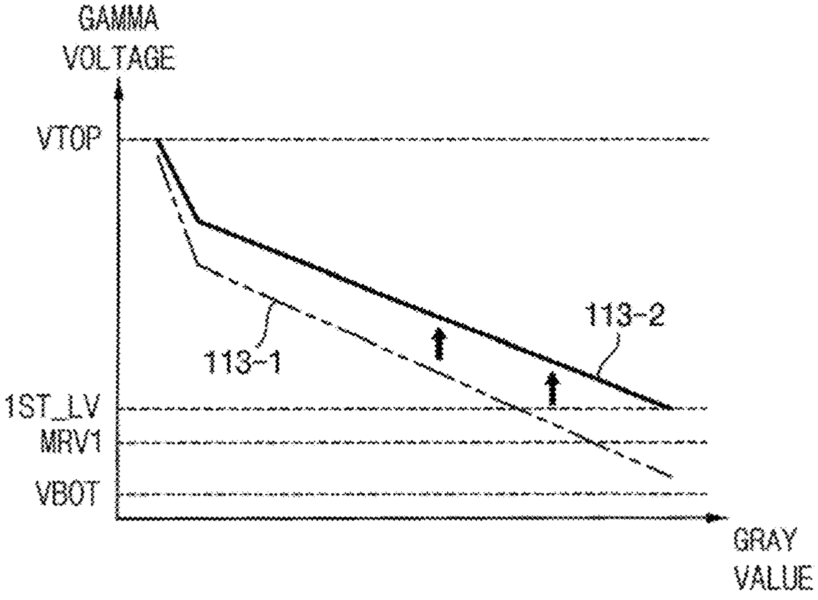

FIGS. 8 and 9 are diagrams for describing the generating a mode determination signal in FIG. 6.

FIGS. 8 and 9 illustrate gamma curves 113-1, 113-2 representing a plurality of gamma voltages corresponding to a plurality of grayscale values. The gamma curve 113-1 may represent a gamma curve before a user of a display device controls the adjustment point of the brightness adjustment unit 114 described above with reference to FIGS. 1 and 5, e.g., a state in which the adjustment point is located in the center of the brightness adjustment unit 114. The gamma curve 113-2 may represent a gamma curve when the user controls the adjustment point to the left to adjust brightness of the display screen to become darker.

Referring to FIG. 8, the gamma curve 113-1 decreases as the grayscale value increases. As described above with reference to FIG. 2, when the pixel Pa included in the display panel driven by the display driver integrated circuit is driven by PMOS transistors, it may be illustrated in a form as the gamma curve 113-1. For example, a low level gamma voltage may correspond to a high level grayscale value, and a high level gamma voltage may correspond to a low level grayscale value.

Referring to FIG. 9, the gamma curve 113-2 may have a form in which the gamma curve 113-1 in FIG. 8 is moved upward. For example, when the user of the display device controls the adjustment point to the left to adjust brightness of the display screen to become darker, a minimum value of the gamma curve increases from about 'VBOT' to about '1ST_LV'.

As described above with reference to FIG. 1, the mode determination reference value MRV may be determined based on a range in which the plurality of buffer circuits 310-1, 310-2, and 310-3 can buffer the gamma voltages and output the buffered gamma voltages without distortion when the first transistors included in the input stage of each of the plurality of buffer circuits 310-1, 310-2, and 310-3 are turned off in the first driving mode. For example, when the mode change unit 319*a* is configured as illustrated in FIG. 7, the mode determination reference value MRV may include the first mode determination reference value and be determined as the value MRV1 in FIG. 9.

Referring back to FIGS. 1 and 6, in response to the first limit value being higher than the first mode determination reference value (S300: YES), the control circuit 100 provides a mode determination signal MDS representing the first driving mode to the output buffer circuit 310, and in response to the first limit value being lower than or equal to the first mode determination reference value (S300: NO), the control circuit 100 provides a mode determination signal MDS representing the second driving mode to the output buffer circuit 310. The display driver integrated circuit 10 drives the display panel in the first driving mode (S500) or in the second driving mode (S700). For example, the output buffer circuit 310 may operate in the first driving mode (S500) or the second driving mode (S700).

Figure 10:
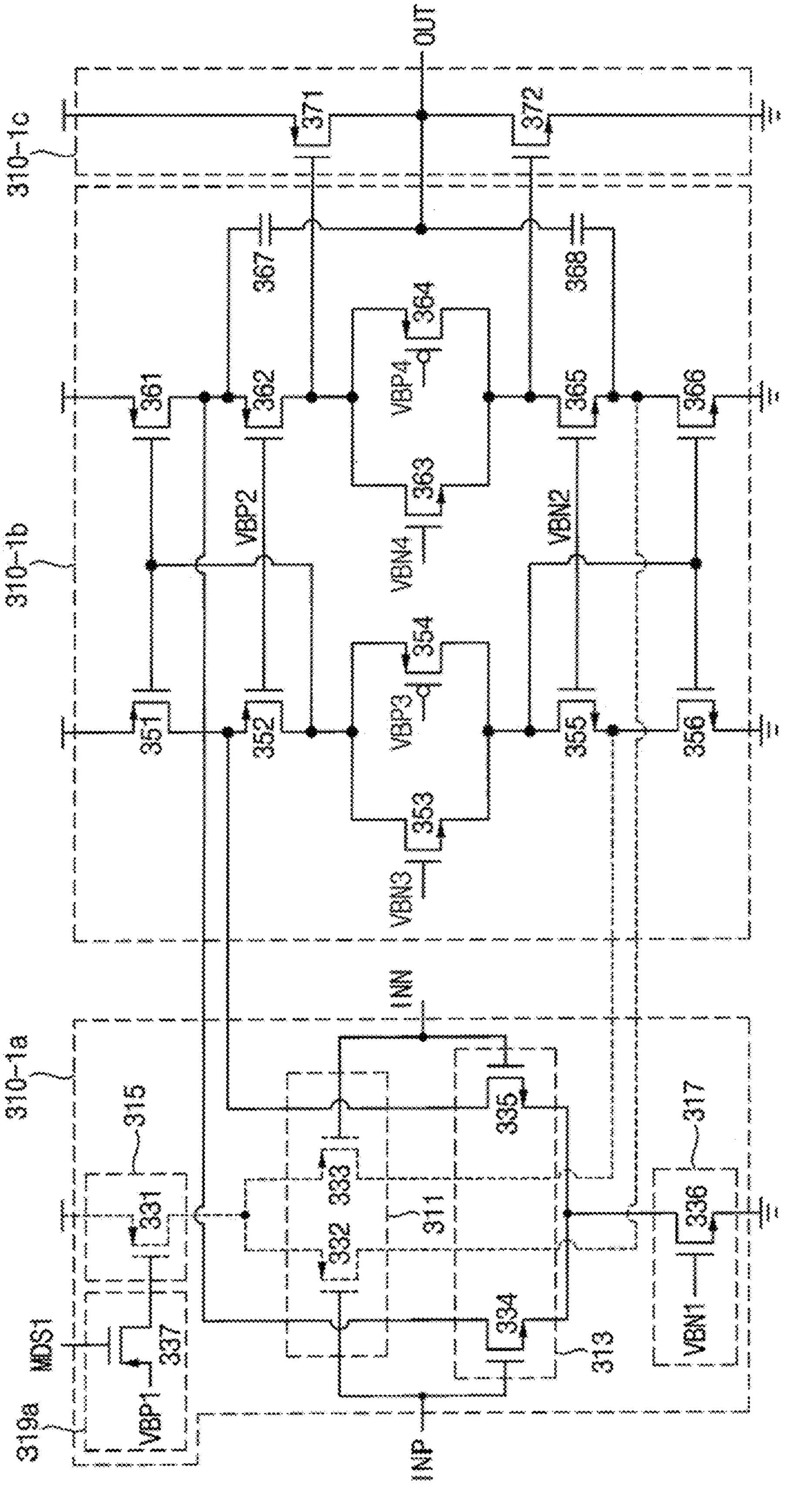
FIG. 10 is a circuit diagram for describing the operating in a first driving mode in FIG. 6.

FIG. 10 is a circuit diagram for describing the operating in a first driving mode in FIG. 6.

Referring to FIGS. 1, 7, and 10, when the control circuit 100 provides the mode determination signal MDS representing the first driving mode to the output buffer circuit 310, a mode determination signal MDS1 may be applied to the gate of the PMOS transistor 337 included in the mode change unit 319*a* to turn off the PMOS transistor 337. In this case, the first transistors included in the input stage 310-1*a* may be turned off, and the second transistors included in the input stage 310-1*a* may be turned on. The first transistors may include PMOS transistors 331, 332, and 333. The second transistors may include NMOS transistors 334, 335, and 336.

Accordingly, when the display driver integrated circuit 10 drives the display panel in the first driving mode, power consumption of the PMOS transistors 331, 332, and 333 may be reduced.

Figure 11:
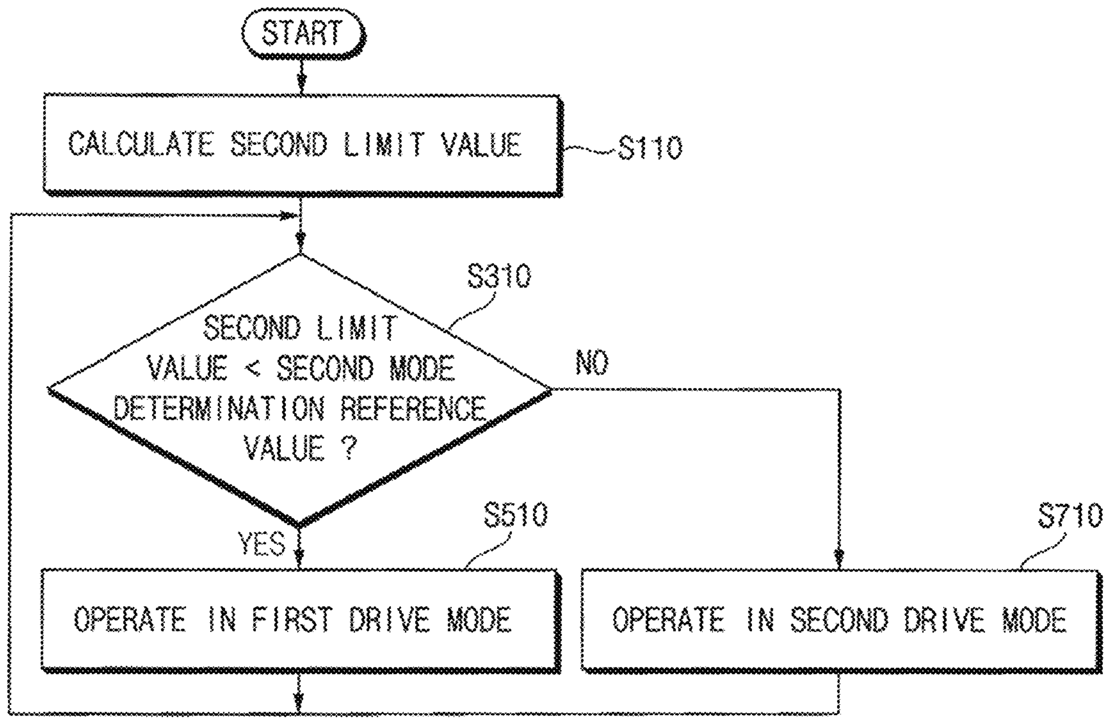
FIG. 11 is a flowchart illustrating an example of operations of the control circuit and the output buffer circuit in FIG. 1.
Figure 12:
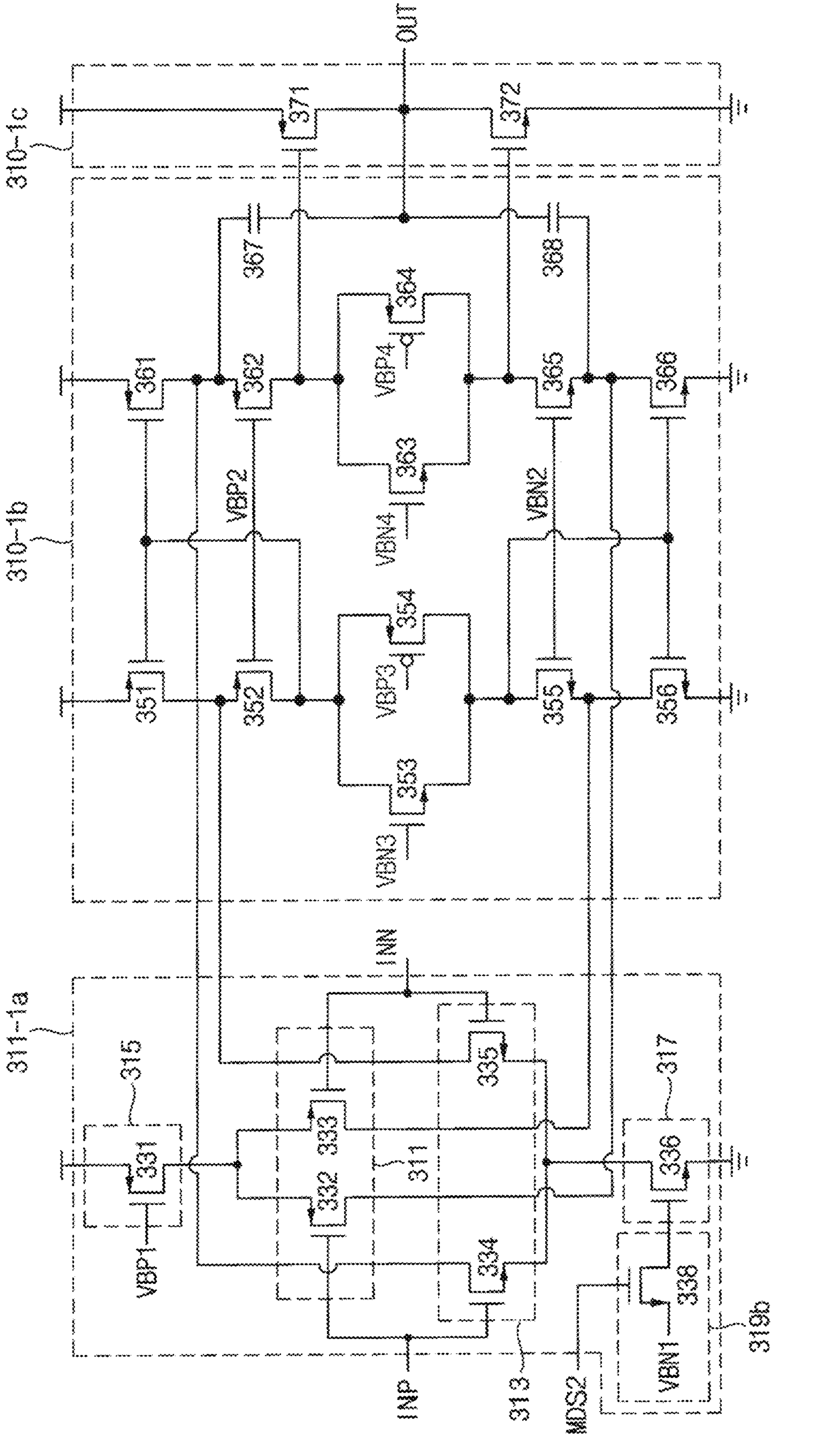
FIG. 12 is a circuit diagram illustrating an example embodiment of a buffer circuit included in the output buffer circuit that performs operations of FIG. 11.

FIG. 11 is a flowchart illustrating an example of operations of the control circuit and the output buffer circuit in FIG. 1. FIG. 12 is a circuit diagram illustrating an example embodiment of a buffer circuit included in the output buffer circuit that performs operations of FIG. 11.

Referring to FIGS. 1, 11, and 12, FIG. 12 illustrates an example of the buffer circuit 310-1 among the plurality of buffer circuits 310-1, 310-2, and 310-3. FIG. 11 illustrates operations when the plurality of buffer circuits 310-1, 310-2, and 310-3 are configured as illustrated in FIG. 12.

Referring to FIG. 12, the buffer circuit 310-1 may include an input stage 311-1*a*, an amplification stage 310-1*b*, and an output stage 310-1*c*.

The input stage 311-1*a* may include a first bias unit 315, a second bias unit 317, a first input unit 311, a second input unit 313, and a mode change unit 319*b*.

The first bias unit 315 may include a PMOS transistor 331. The second bias unit 317 may include an NMOS transistor 336. The first input unit 311 may include PMOS transistors 332, and 333. The second input unit 313 may include NMOS transistors 334 and 335. The mode change unit 319*b* may include a NMOS transistor (or a second mode change transistor) 338.

The first bias unit 315 and the second bias unit 317 may be connected between a power supply voltage and a ground voltage to supply a bias current to the first input unit 311 and the second input unit 313, respectively. The first input unit 311 and the second input unit 313 may generate currents corresponding to differences between input signals INP and INN, respectively. The input signals INP and INN may correspond to gamma voltages selected from among the plurality of gamma voltages GRV generated by the gamma circuit 200 in FIG. 1.

In some example embodiments, bias signals VBP1 and VBN1 may be applied to gates of the PMOS transistor 331 and the NMOS transistor 336, respectively. In this case, the mode change unit 319*b* is connected between the gate of the NMOS transistor 336 and an input line to which the bias signal VBN1 is applied, and thus a timing at which the bias signal VBN1 is applied to the gate of the NMOS transistor 336 may be controlled. The buffer circuit in FIG. 12 has the same circuit configuration as that of the buffer circuit in FIG. 7, except for circuit configurations to which the mode change unit is connected, and thus duplicated descriptions will be omitted below.

Referring back to FIGS. 1 and 11, the control circuit 100 may calculate the gamma limit value including the second limit value based on the panel brightness information PBI, the voltage levels LVT, LVB of the first and second gamma power supply voltages, and the number NGV of the plurality of gamma voltages (S110).

In some example embodiments, the gamma limit value may include the second limit value when the mode change unit 319*b* is connected between the gate of the NMOS transistor 336 and the input line to which the bias signal VBN1 is applied. The second limit value may represent a voltage level of a gamma voltage having the highest voltage level among a plurality of gamma voltages GRV generated in the gamma circuit 200 by a user of the display device controlling an adjustment point of the brightness adjustment unit in FIG. 3.

The second limit value may be calculated as a value between the first gamma power supply voltage and the second gamma power supply voltage based on a second ratio, which is determined by using the panel brightness information PBI and the number NGV of the plurality of gamma voltages. In some example embodiments, the second limit value may be calculated by the following Equation 2.

$$2ND\_LV = VBOT + (VTOP - VBOT)*(1-(M/N)) \qquad \text{[Equation 2]}$$

In Equation 2, 2ND_LV is the second limit value, VTOP is the first gamma power supply voltage, VBOT is the second gamma power supply voltage, N is the number of the plurality of gamma intermediate voltages, and M corresponds to a value represented by the panel brightness information PBI. In this case, N may be equal to '$2^Y$', where Y is a value greater than the number of bits representing the input image data IMG in FIG. 1.

The control circuit 100 may compare the gamma limit value with the mode determination reference value to generate the mode determination signal MDS representing one of the first driving mode and the second driving mode (S300).

In some example embodiments, the mode determination reference value may include the second mode determination reference value when the mode change unit 319*b* is connected between the gate of the NMOS transistor 336 and the input line to which the bias signal VBP1 is applied.

Figure 13:
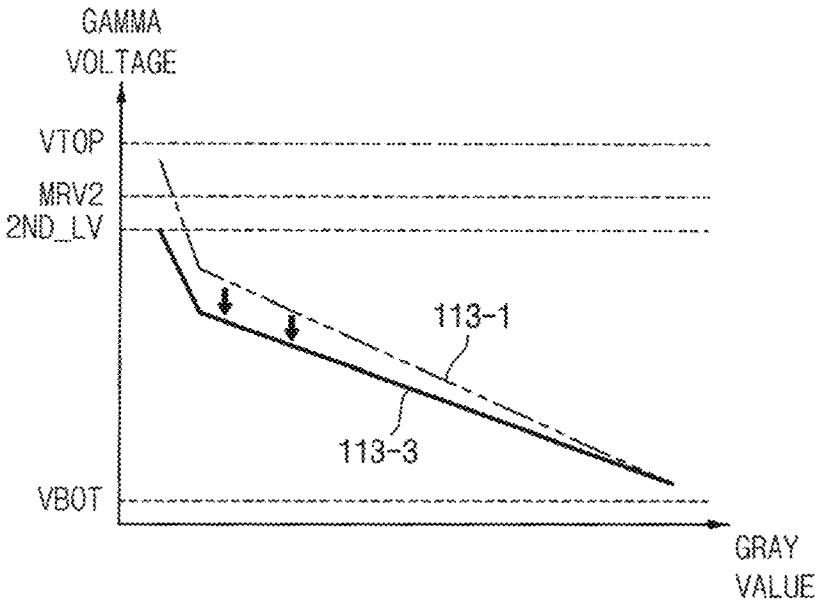
FIG. 13 is a diagram for describing the generating a mode determination signal in FIG. 11.

FIG. 13 is a diagram for describing the generating a mode determination signal in FIG. 11.

FIG. 13 illustrates gamma curves 113-1, 113-3 representing a plurality of gamma voltages corresponding to a plurality of grayscale values. The gamma curve 113-1 may represent a gamma curve before a user of a display device controls the adjustment point of the brightness adjustment unit 114 described above with reference to FIGS. 1 and 5, e.g., a state in which the adjustment point is located in the center of the brightness adjustment unit 114. The gamma curve 113-3 may represent a gamma curve when the user controls the adjustment point to the right to adjust brightness of the display screen to become brighter.

Referring to FIG. 13, the gamma curve 113-3 may have a form in which the gamma curve 113-1 is moved downward. For example, when the user of the display device controls the adjustment point to the right to adjust brightness of the display screen to become brighter, a maximum value of the gamma curve decreases from about 'VTOP' to about '2ND_LV'.

As described above with reference to FIG. 1, the mode determination reference value MRV may be determined based on a range in which the plurality of buffer circuits 310-1, 310-2, and 310-3 can buffer the gamma voltages and output the buffered gamma voltages without distortion when the first transistors included in the input stage of each of the plurality of buffer circuits 310-1, 310-2, and 310-3 are turned off in the first driving mode. For example, when the mode change unit 319*b* is configured as illustrated in FIG. 12, the mode determination reference value MRV may include the second mode determination reference value and be determined as the value MRV2 in FIG. 13.

Referring back to FIGS. 1 and 11, in response to the second limit value being lower than the second mode determination reference value (S310: YES), the control circuit 100 provides a mode determination signal MDS representing the first driving mode to the output buffer circuit 310, and in response to the second limit value being higher than or equal to the second mode determination signal MDS representing the second driving mode to the output buffer circuit 310. The display driver integrated circuit 10 drives the display panel in the first driving mode (S510) or in the second driving mode (S700). For example, the output buffer circuit 310 may operate in the first driving mode (S510) or the second driving mode (S700).

Figure 14:
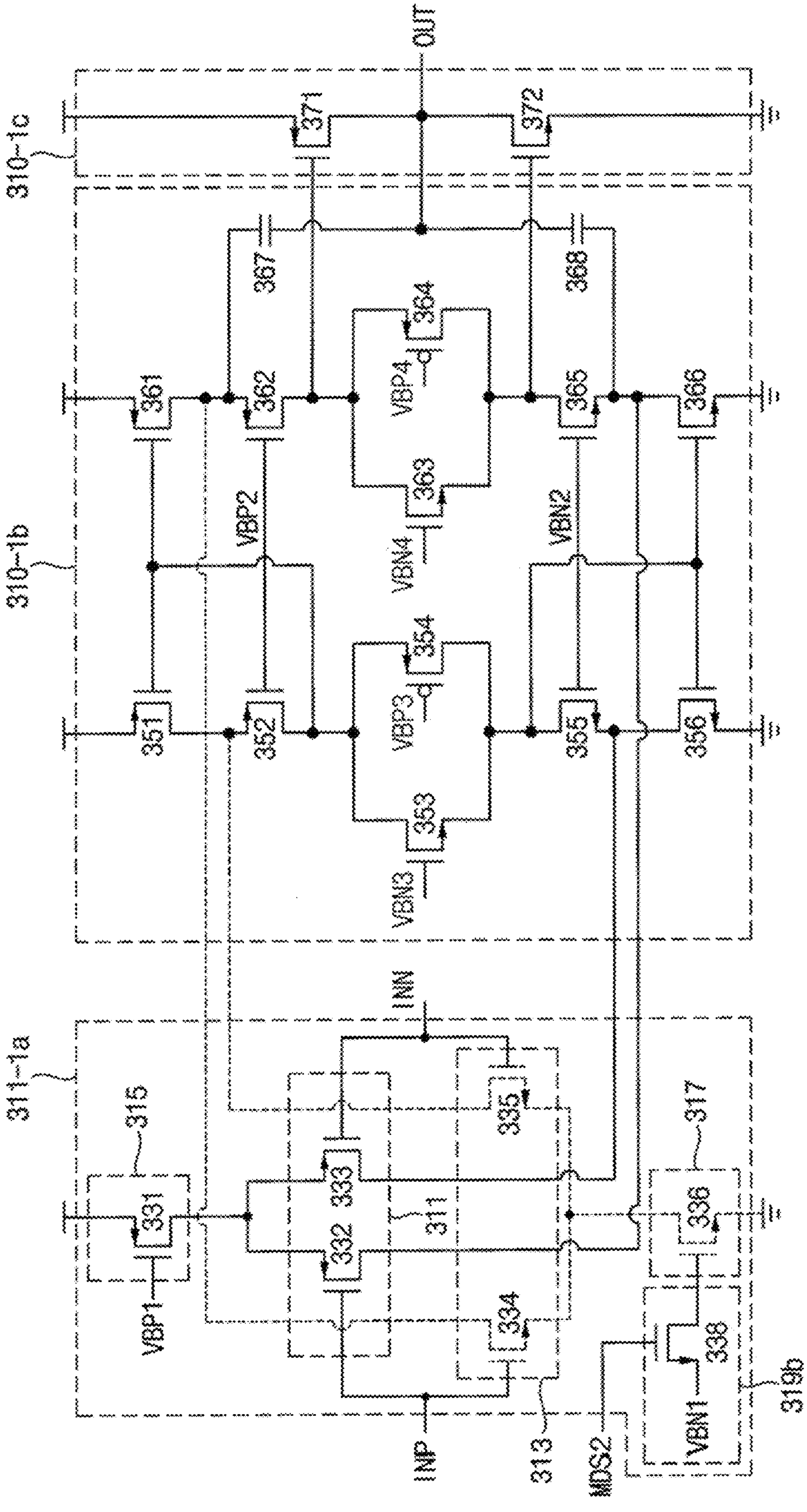
FIG. 14 is a circuit diagram for describing the operating in a first driving mode in FIG. 6.

FIG. 14 is a circuit diagram for describing the operating in a first driving mode in FIG. 6.

Referring to FIGS. 1, 12, and 14, when the control circuit 100 provides the mode determination signal MDS representing the first driving mode to the output buffer circuit 310, a mode determination signal MDS2 may be applied to the gate of the NMOS transistor 338 included in the mode change unit 319*b* to turn off the NMOS transistor 338. In this case, the first transistors included in the input stage 310-1*a* may be turned off, and the second transistors included in the input stage 310-1*a* may be turned on. The first transistors may include NMOS transistors 334, 335, and 336. The second transistors may include PMOS transistors 331, 332, and 333.

Accordingly, when the display driver integrated circuit 10 drives the display panel in the first driving mode, power consumption of the NMOS transistors 334, 335, and 336 may be reduced.

Figure 15:
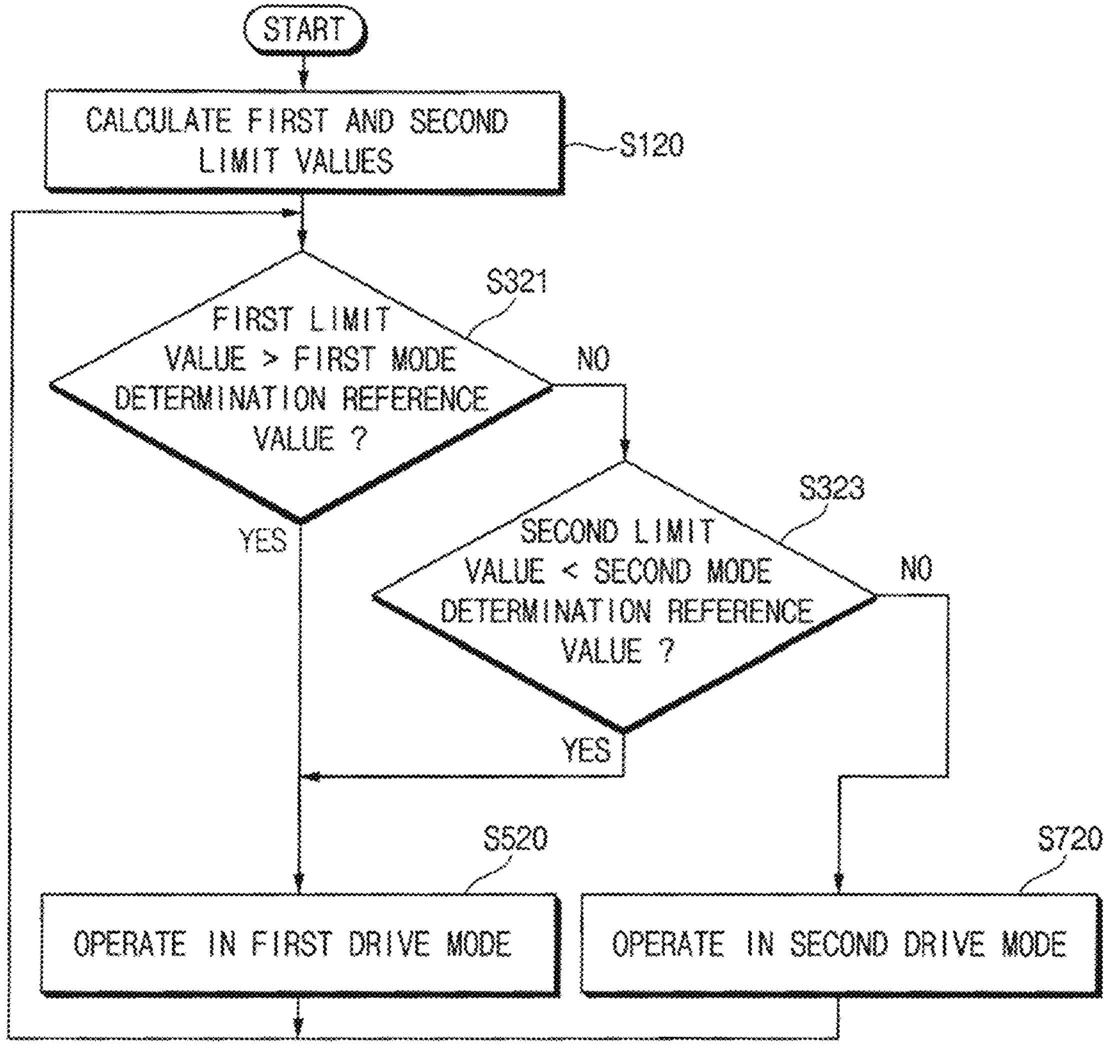
FIG. 15 is a flowchart illustrating an example of operations of the control circuit and the output buffer circuit in FIG. 1.
Figure 16:
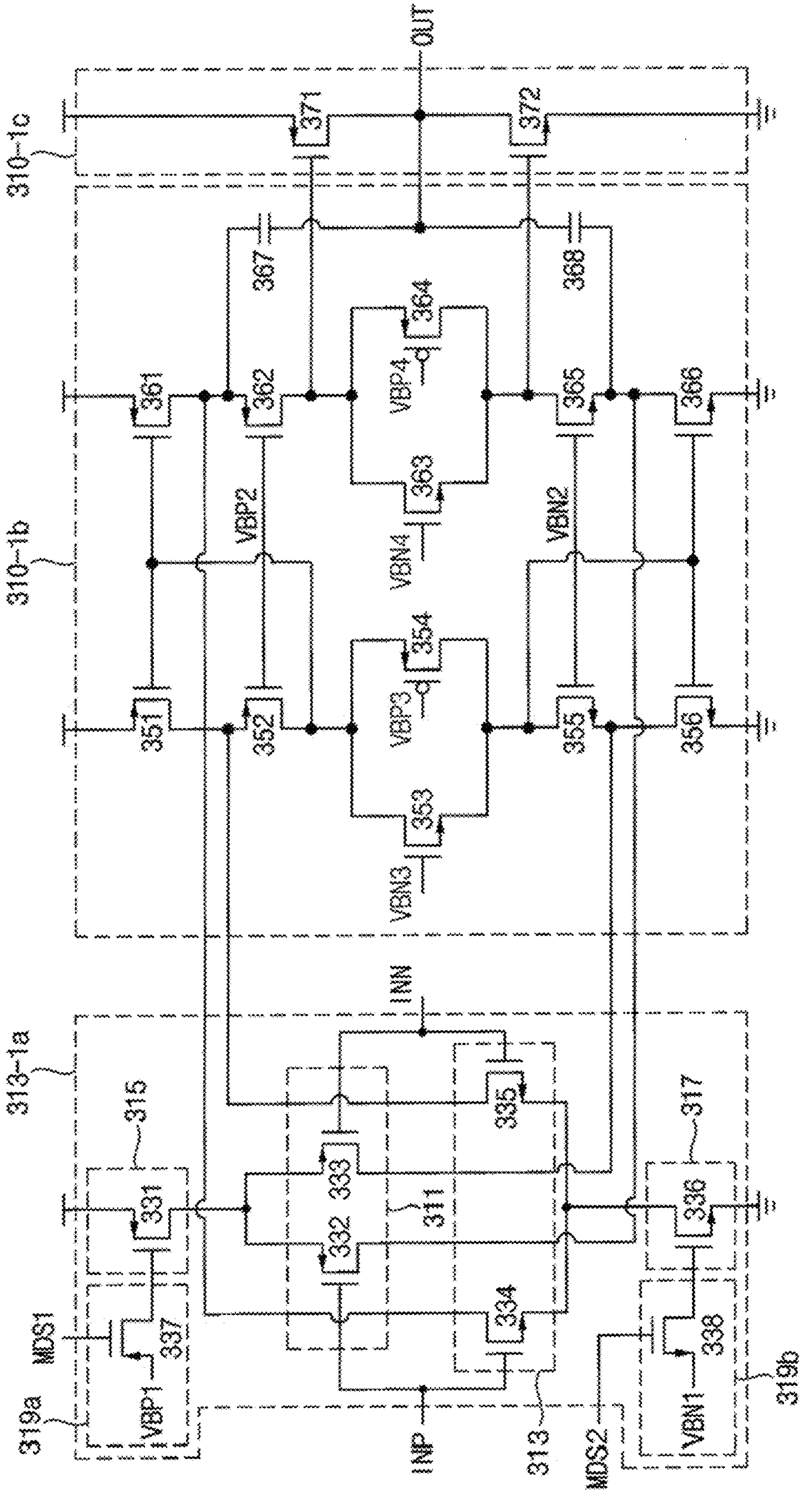
FIG. 16 is a circuit diagram illustrating an example embodiment of a buffer circuit included in the output buffer circuit that performs operations of FIG. 15.

FIG. 15 is a flowchart illustrating an example of operations of the control circuit and the output buffer circuit in FIG. 1. FIG. 16 is a circuit diagram illustrating an example embodiment of a buffer circuit included in the output buffer circuit that performs operations of FIG. 15.

Referring to FIGS. 1, 15, and 16, FIG. 16 illustrates an example of the buffer circuit 310-1 among the plurality of buffer circuit 310-1, 310-2, and 310-3. FIG. 15 illustrates operations when the plurality of buffer circuits 310-1, 310-2, and 310-3 are configured as illustrated in FIG. 16.

Referring to FIG. 16, the buffer circuit 310-1 may include an input stage 313-1*a*, an amplification stage 310-1*b*, and an output stage 310-1*c*.

The input stage 313-1*a* may include a first bias unit 315, a second bias unit 317, a first input unit 311, a second input unit 313, and a mode change unit 310*a*, 319*b*.

The first bias unit 315 may include a PMOS transistor 331. The second bias unit 317 may include an NMOS transistor 336. The first input unit 311 may include PMOS transistors 332, and 333. The second input unit 313 may include NMOS transistors 334 and 335. The mode change unit 319*a* may include a PMOS transistor (or a first mode change transistor) 337. The mode change unit 319*b* may include a NMOS transistor (or a second mode change transistor) 338.

The first bias unit 315 and the second bias unit 317 may be connected between a power supply voltage and a ground voltage to supply a bias current to the first input unit 311 and the second input unit 313, respectively. The first input unit 311 and the second input unit 313 may generate currents corresponding to differences between input signals INP and INN, respectively. The input signals INP and INN may correspond to gamma voltages selected from among the plurality of gamma voltages GRV generated by the gamma circuit 200 in FIG. 1.

In some example embodiments, bias signals VBP1 and VBN1 may be applied to gates of the PMOS transistor 331 and the NMOS transistor 336, respectively. In this case, the mode change unit 319*a* is connected between the gate of the PMOS transistor 331 and an input line to which the bias signal VBP1 is applied, and thus a timing at which the bias signal VBP1 is applied to the gate of the PMOS transistor 331 may be controlled. The mode change unit 319*b* is connected between the gate of the NMOS transistor 336 and an input line to which the vias signal VBN1 is applied, and thus a timing at which the bias signal VBN1 is applied to the gate of the NMOS transistor 336 may be controlled. The buffer circuit in FIG. 16 has the same circuit configuration as that of the buffer circuit in FIGS. 7 and 12, except for circuit configurations to which the mode change unit is connected, and thus duplicated descriptions will be omitted below.

Referring back to FIGS. 1 and 15, the control circuit 100 may calculate the gamma limit value including the first limit value and the second limit value based on the panel brightness information PBI, the voltage levels LVT, LVB of the first and second gamma power supply voltages, and the number NGV of the plurality of gamma voltages (S120).

In some example embodiments, the gamma limit value may include the first limit value and the second limit value when the mode change unit 319*a* is connected between the gate of the PMOS transistor 331 and the input line to which the vias signal VBP1 is applied, and when the mode change unit 319*b* is connected between the gate of the NMOS transistor 336 and the input line to which the bias signal VBN1 is applied. The first limit value may represent a voltage level of a gamma voltage having the lowest voltage level among a plurality of gamma voltages GRV generated in the gamma circuit 200 by a user of the display device controlling an adjustment point of the brightness adjustment unit in FIG. 3. The second limit value may represent a voltage level of a gamma voltage having the highest voltage level among the plurality of gamma voltages GRV generated in the gamma circuit 200 by the user of the display device controlling the adjustment point of the brightness adjustment unit in FIG. 3.

The first limit value may be calculated by Equation 1 described above with reference to FIG. 6. The second limit value may be calculated by Equation 2 described above with reference to FIG. 11.

The first limit value may be calculated as a value between the first gamma power supply voltage and the second gamma power supply voltage based on a first ratio, which is determined by using the panel brightness information PBI and the number NGV of the plurality of gamma voltages. The second limit value may be calculated as a value between the first gamma power supply voltage and the second gamma power supply voltage based on a second ratio, which is determined by using the panel brightness information PBI and the number NGV of the plurality of gamma voltages.

The control circuit 100 may compare the first limit value with the first mode determination reference value, and compare the second limit value with the second mode determination reference value, to generate the mode determination signal MDS representing one of the first driving mode and the second driving mode (S321, S323).

In some example embodiments, the mode determination reference value may include the first mode determination reference value and the second mode determination reference value when the mode change unit 319*a* is connected between the gate of the PMOS transistor 331 and the input line to which the bias signal VBP1 is applied, and when the mode change unit 319*b* is connected between the gate of the NMOS transistor 336 and the input line to which the bias signal VBN1 is applied.

Specifically, in response to the first limit value being higher than the first mode determination reference value (S321: YES), the control circuit 100 provides a mode determination signal MDS representing the first driving mode to the output buffer circuit 310. In response to the first limit value being lower than or equal to the first mode determination reference value (S321: NO) and the second limit value being lower than the second mode determination reference value (S323: YES), the control circuit 100 provides a mode determination signal MDS representing the first driving mode to the output buffer circuit 310. In response to the first limit value being lower than or equal to the first mode determination reference value (S321: NO) and the second limit value being higher than the second mode determination reference value (S323: NO), the control circuit 100 provides a mode determination signal MDS representing the second driving mode to the output buffer circuit 310.

The display driver integrated circuit 10 drives the display panel in the first driving mode (S520) or in the second driving mode (S720). For example, the output buffer circuit 310 may operate in the first driving mode (S520) or the second driving mode (S720).

Referring back to FIGS. 1 and 11, in response to the second limit value being lower than the second mode determination reference value (S310: YES), the control circuit 100 provides a mode determination signal MDS representing the first driving mode to the output buffer circuit 310, and in response to the second limit value being higher than or equal to the second mode determination signal MDS representing the second driving mode to the output buffer circuit 310. The display driver integrated circuit 10 drives the display panel in the first driving mode (S510) or in the second driving mode (S700). For example, the output buffer circuit 310 may operate in the first driving mode (S510) or the second driving mode (S700). In this case, in the first driving mode, one of the first and second transistors included in the input stage 311-1*a* included in the output buffer circuit 310 may be turned off by one of the operations described above with reference to FIGS. 10 and 14.

Figure 17:
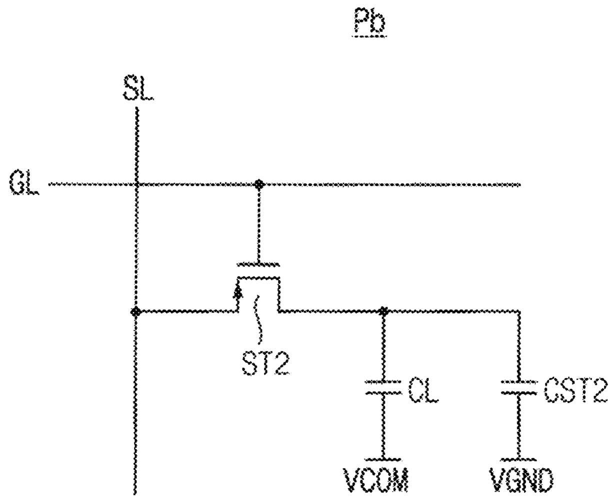
FIG. 17 is a circuit diagram illustrating an example embodiment of a pixel included in a display panel driven by the display driver integrated circuit of FIG. 1.

FIG. 17 is a circuit diagram illustrating an example embodiment of a pixel included in a display panel driven by the display driver integrated circuit of FIG. 1.

Referring to FIG. 17, a Pixel Pb may include a switching transistor ST2, a liquid crystal capacitor CL, and a storage capacitor CST2.

The display panel driven by the display driver integrated circuit may include a plurality of pixels, and the pixel Pb may be included in the plurality of pixels.

The switching transistor ST2 may electrically connect a source line SL to the capacitors CL, CST2 in response to a gate driving signal applied through a gate line GL. The liquid crystal capacitor CL may be coupled between the switching transistor ST2 and the common power supply voltage VCOM. The storage capacitor CST may be coupled between the switching transistor ST2 and a ground voltage VGND. The liquid crystal capacitor CL may control the amount of transmitted light according to data stored in the storage capacitor CST2.

The pixel Pb of FIG. 17 is an example of a liquid crystal (LC) pixel, but the structure of the pixel Pb may be varied, and the LC pixel having various configurations may be driven by the display driver integrated circuit according to example embodiments. Hereinafter, it is assumed that the display driver integrated circuit drives the pixel Pb of FIG. 16 with reference to FIGS. 18 and 19. For example, a shape of gamma curves in FIG. 19 may correspond to a case in which the switching transistor ST2 included in the pixel Pb is implemented as PMOS transistors.

Figure 18:
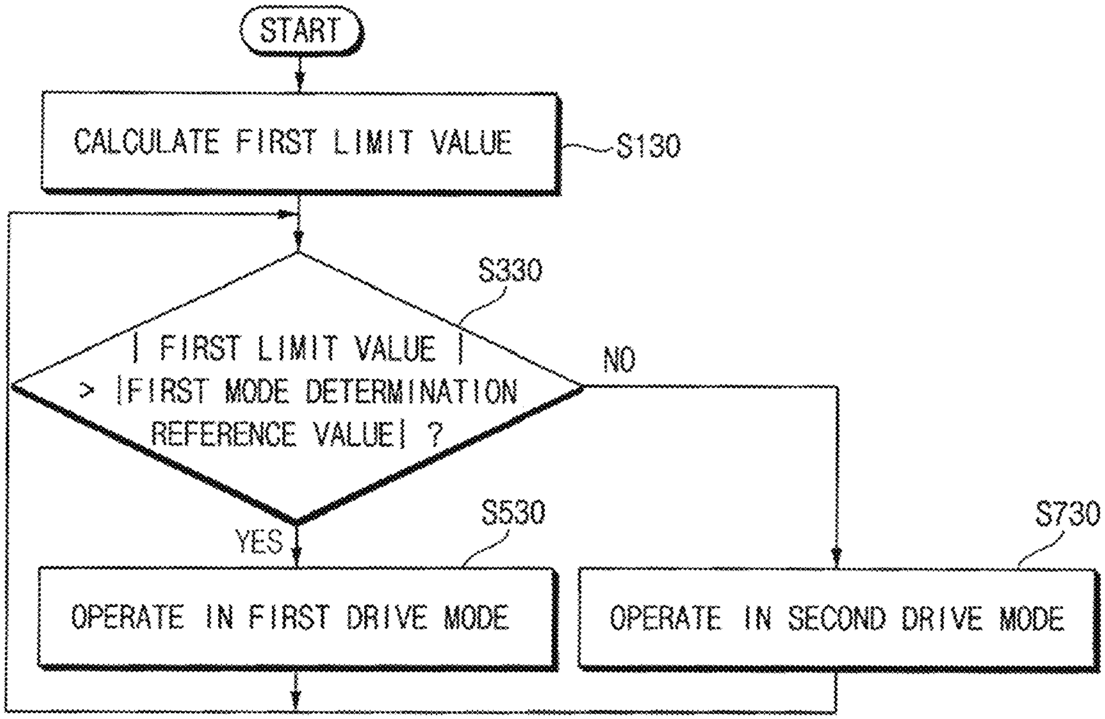
FIG. 18 is a flowchart illustrating an example of operations of the control circuit and the output buffer circuit in FIG. 1.

FIG. 18 is a flowchart illustrating an example of operations of the control circuit and the output buffer circuit in FIG. 1.

FIG. 18 illustrates operations when the plurality of buffer circuits 310-1, 310-2, and 310-3 in FIG. 1 are configured as illustrated in FIG. 7.

Referring to FIGS. 1 and 18, the control circuit 100 may calculate the gamma limit value including the first limit value based on the panel brightness information PBI, the voltage levels LVT, LVB of the first and second gamma power supply voltages, and the number NGV of the plurality of gamma voltages (S130).

The control circuit 100 may compare the gamma limit value with the mode determination reference value to generate the mode determination signal MDS representing one of the first driving mode and the second driving mode (S330).

In some example embodiments, the mode determination reference value may include the first mode determination reference value when the mode change unit 319*a* is connected between the gate of the PMOS transistor 331 and the input line to which the bias signal VBP1 is applied.

Figure 19:
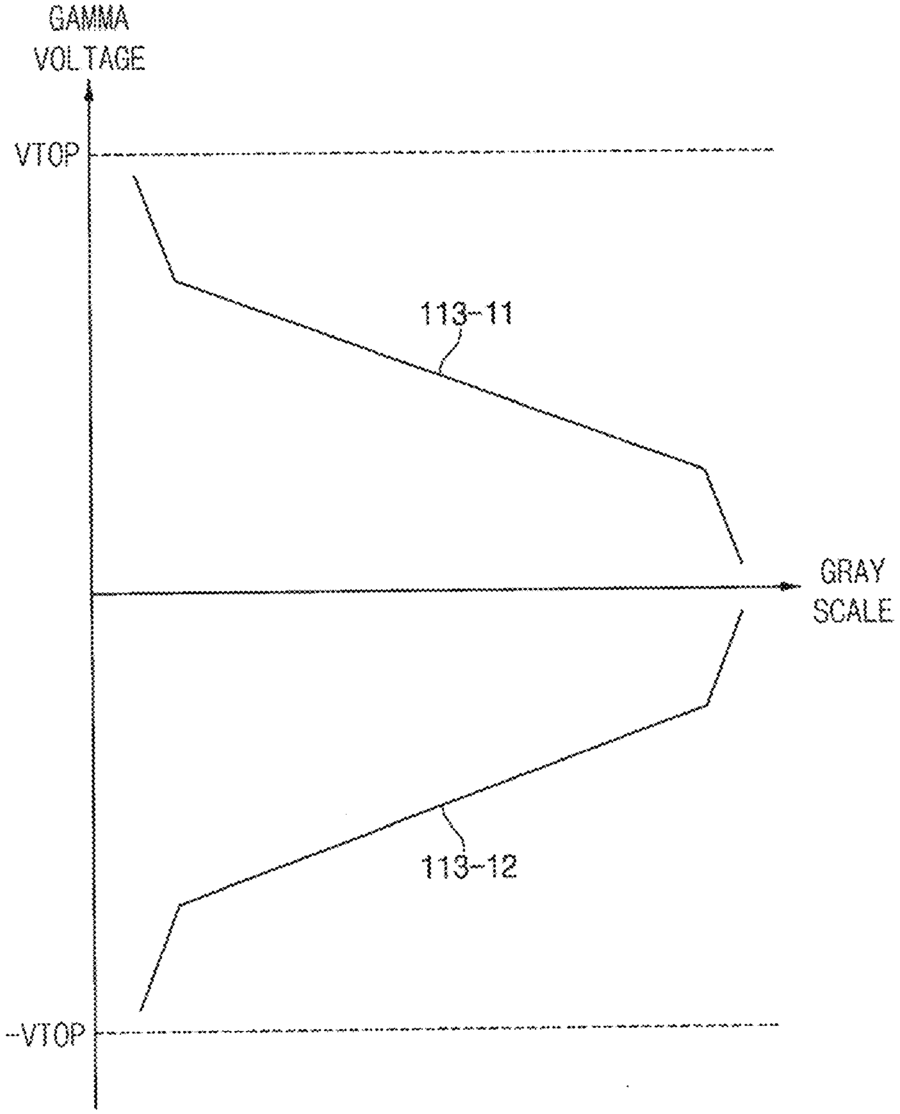
FIG. 19 is a diagram for describing the generating a mode determination signal in FIG. 18.

FIG. 19 is a diagram for describing the generating a mode determination signal in FIG. 18.

FIG. 19 illustrates gamma curves 113-11, 113-12 representing a plurality of gamma voltages corresponding to a plurality of grayscale values. The gamma curves 113-11, 113-12 may represent gamma curves before a user of a display device controls the adjustment point of the brightness adjustment unit 114 described above with reference to FIGS. 1 and 5, e.g., a state in which the adjustment point is located in the center of the brightness adjustment unit 114.

Referring to FIG. 19, an absolute value of the gamma curves 113-11, 113-12 decreases as the grayscale value increases. As described above with reference to FIG. 17, when the pixel Pb included in the display panel driven by the display driver integrated circuit is driven by PMOS transistors, it may be illustrated in a form as the gamma curves 113-11, 113-12.

Referring back to FIGS. 1 and 18, in response to an absolute value of the first limit value being higher than the first mode determination reference value (S330: YES), the control circuit 100 provides a mode determination signal MDS representing the first driving mode to the output buffer circuit 310, and in response to the absolute value of the first limit value being lower than or equal to the first mode determination reference value (S330: NO), the control circuit 100 provides a mode determination signal MDS representing the second driving mode to the output buffer circuit 310. The display driver integrated circuit 10 drives the display panel in the first driving mode (S530) or in the second driving mode (S730). For example, the output buffer circuit 310 may operate in the first driving mode (S530) or the second driving mode (S730).

Although operations in a case where the plurality of buffer circuits are configured as illustrated in FIG. 7 have been described with reference to FIG. 18, the configurations of the plurality of buffer circuits may be varied. The plurality of buffer circuits may be configured as illustrated in FIG. 12, and in this case, the control circuit 100 and the output buffer circuit 310 may operate similarly to the operations described above with reference to FIG. 11 in consideration of the characteristics of the pixel Pb of FIG. 17.

Figure 20:
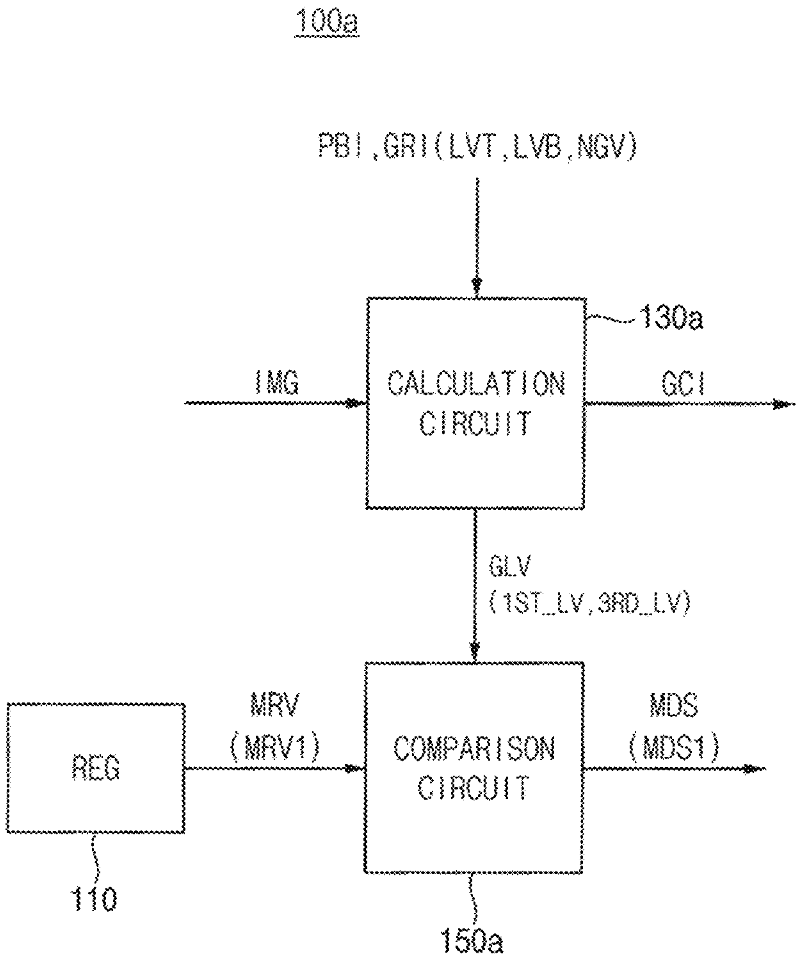
FIG. 20 is a block diagram illustrating an example embodiment of the control circuit in FIG. 1.

FIG. 20 is a block diagram illustrating an example embodiment of the control circuit in FIG. 1.

Referring to FIGS. 1 and 20, the control circuit 100*a* may include a register 110, a calculation circuit 130*a*, and a comparison circuit 150.

The register 110 may store a mode determination reference value MRV used in determining one of the first driving mode and the second driving mode (or generating the mode decision signal MDS).

In some example embodiments, the mode determination reference value MRV may include at least one of a first mode determination reference value MRV1 and a second mode determination reference value MRV2 according to circuit configurations of the mode change unit described above with reference to FIG. 1, but for convenience of description, it is assumed that the mode determination reference value MRV includes only the first mode determination reference value MRV1.

The calculation circuit 130*a* may further receive input image data IMG as compared to the calculation circuit 130 illustrated in FIG. 4. Accordingly, the calculation circuit 130*a* may receive the input image data IMG, the panel brightness information PBI, and the gamma reference information GRI including the voltage levels LVT, LVB of the first and second gamma power voltages and the number NGV of the plurality of gamma voltages GRV, and calculate the gamma limit value GLV based on the input image data IMG, the panel brightness information PBI, and the gamma reference information GM.

In some example embodiments, the calculation circuit 130*a* may determine a first ratio using the panel brightness information PBI and the number NGV of the plurality of gamma voltages GRV, and calculate the gamma limit value GLV based on the first ratio.

In some example embodiments, the gamma limit value GLV may be a value between the first gamma power supply voltage and the second gamma power supply voltage, and include at least one of a first limit value 1ST_LV and a second limit value 2ND_LV according to circuit configurations of the mode change unit described above with reference to FIG. 1. However, for convenience of description, it is assumed that the gamma limit value GLV includes only the first limit value 1ST_LV.

In some example embodiments, the gamma limit value GLV may further include a third limit value 3RD_LV. The third limit value 3RD_LV may correspond to a maximum grayscale value of a current frame of a display panel driven by the display driver integrated circuit 10. For example, the third limit value 3RD_LV may represent a voltage level of a gamma voltage corresponding to the highest grayscale value among grayscale values represented by the input image data IMG corresponding to one frame.

The comparison circuit 150*a* may compare the gamma limit value GLV with the mode determination reference value MRV to generate the mode determination signal MDS. In some example embodiments, the first limit value 1ST_LV may be compared with the first mode determination reference value MRV1, and the third limit value 3RD_LV may be additionally compared with the first mode determination reference value MRV1.

Figure 21:
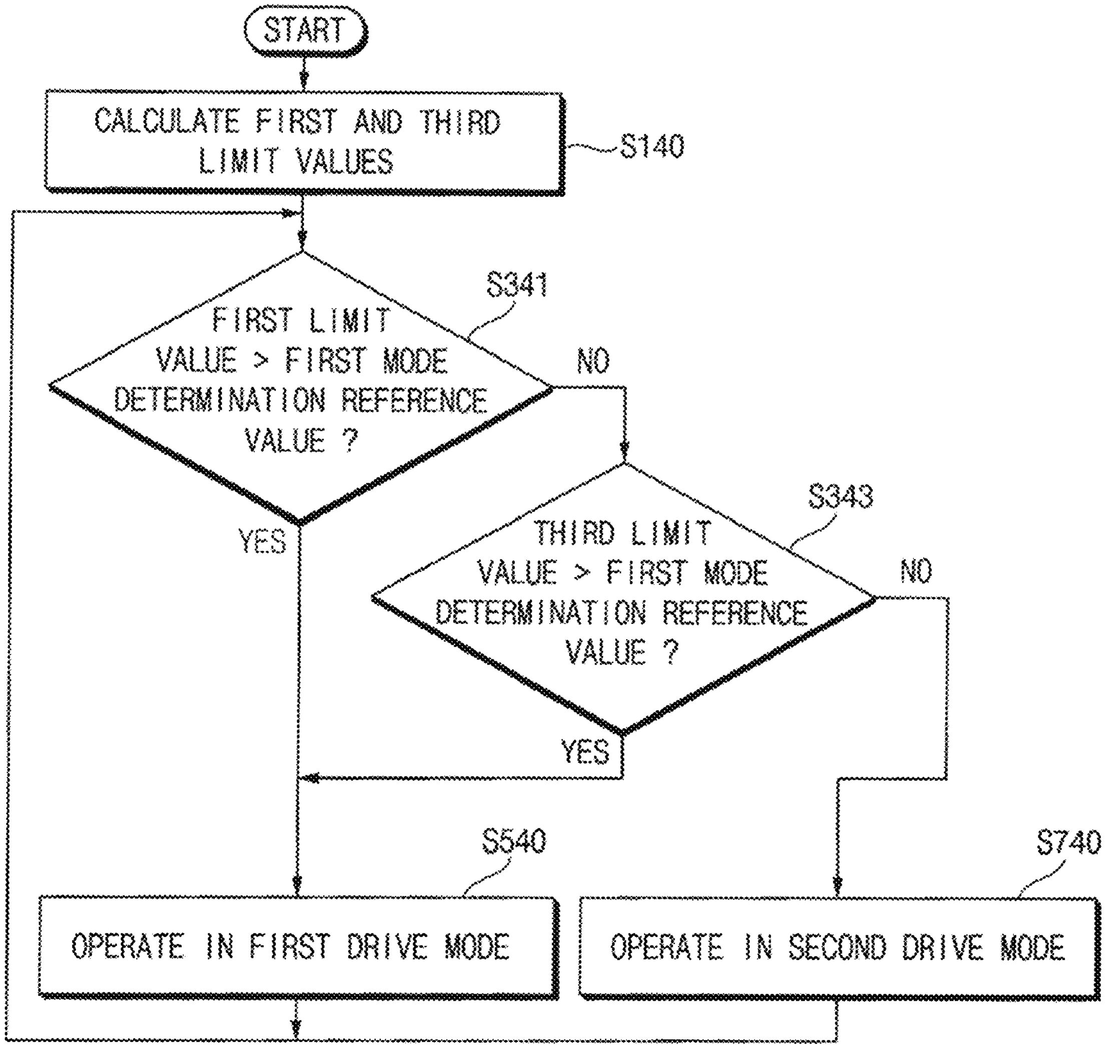
FIG. 21 is a flowchart illustrating an example of operations of the control circuit and the output buffer circuit in FIG. 1.

FIG. 21 is a flowchart illustrating an example of operations of the control circuit and the output buffer circuit in FIG. 1.

FIG. 21 illustrates operations when the plurality of buffer circuits 310-1, 310-2, and 310-3 in FIG. 1 are configured as illustrated in FIG. 7.

Referring to FIGS. 1, 20, and 21, the control circuit 100*a* may calculate the gamma limit value including the first limit value 1ST_LV and the third limit value 3RD_LV based on the input image data IMG, the panel brightness information PBI, the voltage levels LVT, LVB of the first and second gamma power supply voltages, and the number NGV of the plurality of gamma voltages (S140).

The control circuit 100*a* may compare the gamma limit value with the mode determination reference value to generate the mode determination signal MDS representing one of the first driving mode and the second driving mode (S341, S343).

In some example embodiments, the mode determination reference value may include the first mode determination reference value when the mode change unit 319*a* is connected between the gate of the PMOS transistor 331 and the input line to which the bias signal VBP1 is applied.

Figure 22:
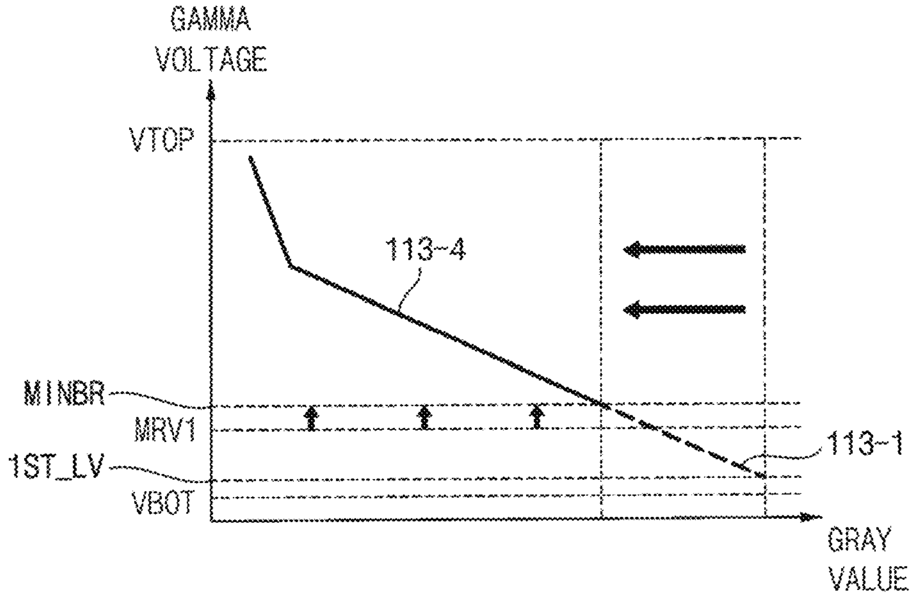
FIG. 22 is a diagram for describing the generating a mode determination signal in FIG. 21.

FIG. 22 is a diagram for describing the generating a mode determination signal in FIG. 21.

FIG. 22 illustrates gamma curves 113-1, 113-4 representing a plurality of gamma voltages corresponding to a plurality of grayscale values. The gamma curve 113-1, which is represented by a dotted line, may represent gamma curve before a user of a display device controls the adjustment point of the brightness adjustment unit 114 described above with reference to FIGS. 1 and 5, e.g., a state in which the adjustment point is located in the center of the brightness adjustment unit 114. The gamma curve 113-4, which is represented by a solid line, may represent a gamma curve corresponding to gamma voltages required to represent only grayscale values of input image data IMG corresponding to one frame of the display panel.

Referring to FIG. 22, the gamma curve 113-4 has a shape similar to the gamma curve 113-1, but the third limit value 3RD_LV, e.g., a minimum value, of the gamma curve 113-4 is higher than the first limit value 1ST_LV, e.g., the minimum value, of the gamma curve 113-1. For example, when a voltage level of gamma voltage corresponding to data having the highest grayscale value among the input image data IMG corresponding to one frame is higher than the first mode determination reference value MRV1, it may be illustrated as the gamma curve 113-4.

Referring back to FIGS. 1, 20, and 21, in response to the first limit value being higher than the first mode determination reference value (S341: YES), the control circuit 100*a* provides a mode determination signal MDS representing the first driving mode to the output buffer circuit 310. In response to the first limit value being lower than or equal to the first mode determination reference value (S341: NO) and the third limit value being higher than the first mode determination reference value (S343: YES), the control circuit 100*a* provides a mode determination signal MDS representing the first driving mode to the output buffer circuit 310. In response to the first limit value being lower than or equal to the first mode determination reference value (S341: NO) and the third limit value being lower than or equal to the first mode determination reference value (S343: NO), the control circuit 100*a* provides a mode determination signal MDS representing the second driving mode to the output buffer circuit 310.

The display driver integrated circuit 10 drives the display panel in the first driving mode (S540) or in the second driving mode (S740). For example, the output buffer circuit 310 may operate in the first driving mode (S540) or the second driving mode (S740).

Although operations in a case where the plurality of buffer circuits are configured as illustrated in FIG. 7 have been described with reference to FIGS. 20 to 22, the configurations of the plurality of buffer circuits may be varied. The plurality of buffer circuits may be configured as illustrated in FIG. 12. In this case, the mode determination reference value MRV may include the second mode determination reference value, and the gamma limit value GLV may include the second limit value and a fourth limit value. The fourth limit value may correspond to a minimum grayscale value of a current frame of a display panel driven by the display driver integrated circuit 10. For example, the fourth limit value may represent a voltage level of a gamma voltage corresponding to the lowest grayscale value among grayscale values represented by the input image data IMG corresponding to one frame.

Specifically, the control circuit 100*a* may compare the gamma limit value GLV with mode determination reference value MRV to generate the mode determination signal MDS. For example, the control circuit 100*a* may compare the second limit value with the second mode determination reference value MRV2, and additionally compare the fourth limit value with the second mode determination reference value MRV2. In response to the second limit value being lower than the second mode determination reference value MRV2, the control circuit 100*a* provides a mode determination signal MDS representing the first driving mode to the output buffer circuit 310. In response to the second limit value being higher than or equal to the second mode determination reference value and the fourth limit value being lower than the second mode determination reference vale, the control circuit 100*a* provides a mode determination signal representing the first driving mode to the output buffer circuit 310. In response to the second limit value being higher than or equal to the second mode determination reference value and the fourth limit value being higher than or equal to the second mode determination reference value, the control circuit 100*a* provides a mode determination signal MDS representing the second driving mode to the output buffer circuit 310.

Figure 23:
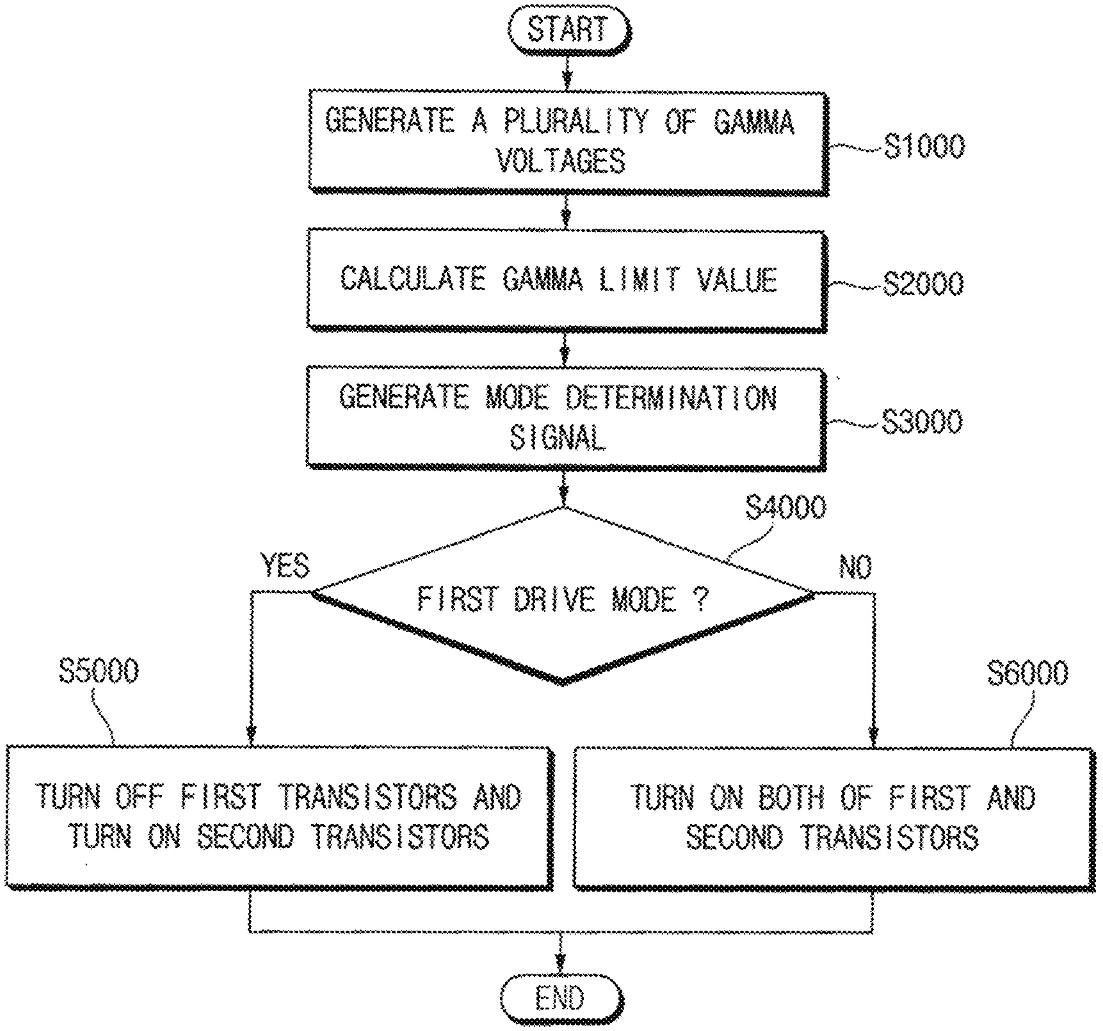
FIG. 23 is a flowchart illustrating a method of operating a display driver integrated circuit according to example embodiments.

FIG. 23 is a flowchart illustrating a method of operating a display driver integrated circuit according to example embodiments.

Referring to FIG. 23, in a method of operating a display driver integrated circuit according to example embodiments, a plurality of gamma voltages may be generated based on a gamma control signal, a first gamma power supply voltage, and a second gamma power supply voltage (S1000). Operations S1000 may be performed by the gamma circuit 200 described above with reference to FIG. 1.

A gamma limit value may be calculated based on panel brightness information, voltage levels of the first and second gamma power voltages, and the number of the plurality of gamma voltages (S2000). A mode determination signal representing one of a first driving mode and a second driving mode may be generated by comparing the gamma limit value with a mode determination reference value (S3000).

Operations S2000 and S3000 may be performed by the control circuit 100, 100a described above with reference to FIGS. 1 and 20.

In some example embodiments, the gamma limit value may include a first limit value corresponding to a minimum gamma voltage having the lowest voltage level among the plurality of gamma voltages, and the mode determination reference value may include a first mode determination reference value. In this case, the first limit value may be compared with the first mode determination reference value. In response to the first limit value being higher than the first mode determination reference value, the mode determination signal representing the first driving mode may be generated. In response to the first limit value being lower than or equal to the first mode determination value, the mode determination signal representing the second driving mode may be generated.

In some example embodiments, the gamma limit value may include a second limit value corresponding to a maximum gamma voltage having the highest voltage level among the plurality of gamma voltages, and the mode determination reference value may include a second mode determination reference value. In this case, the second limit value being lower than the second mode determination reference value, the mode determination signal representing the first driving mode may be generated. In response to the second limit value being higher than or equal to the second mode determination value, the mode determination signal representing the second driving mode may be generated.

In the first driving mode (S4000: YES), first transistors having a first type may be turned off and second transistors having a second type may be turned on by an input stage included in each of a plurality of buffer circuits (S5000). Each of the plurality of buffer circuits may include the input stage, an amplification stage, and an output stage. Each of the input stage, the amplification stage, and the output stage may include the first transistors and the second transistors.

In the second driving mode (S4000: NO), both of the first and second transistors may be turned on by the input stage included in each of the plurality of buffer circuits (S6000). Operations S5000 and S6000 may be performed by the output buffer circuit 310 described above with reference to FIG. 1.

Figure 24:
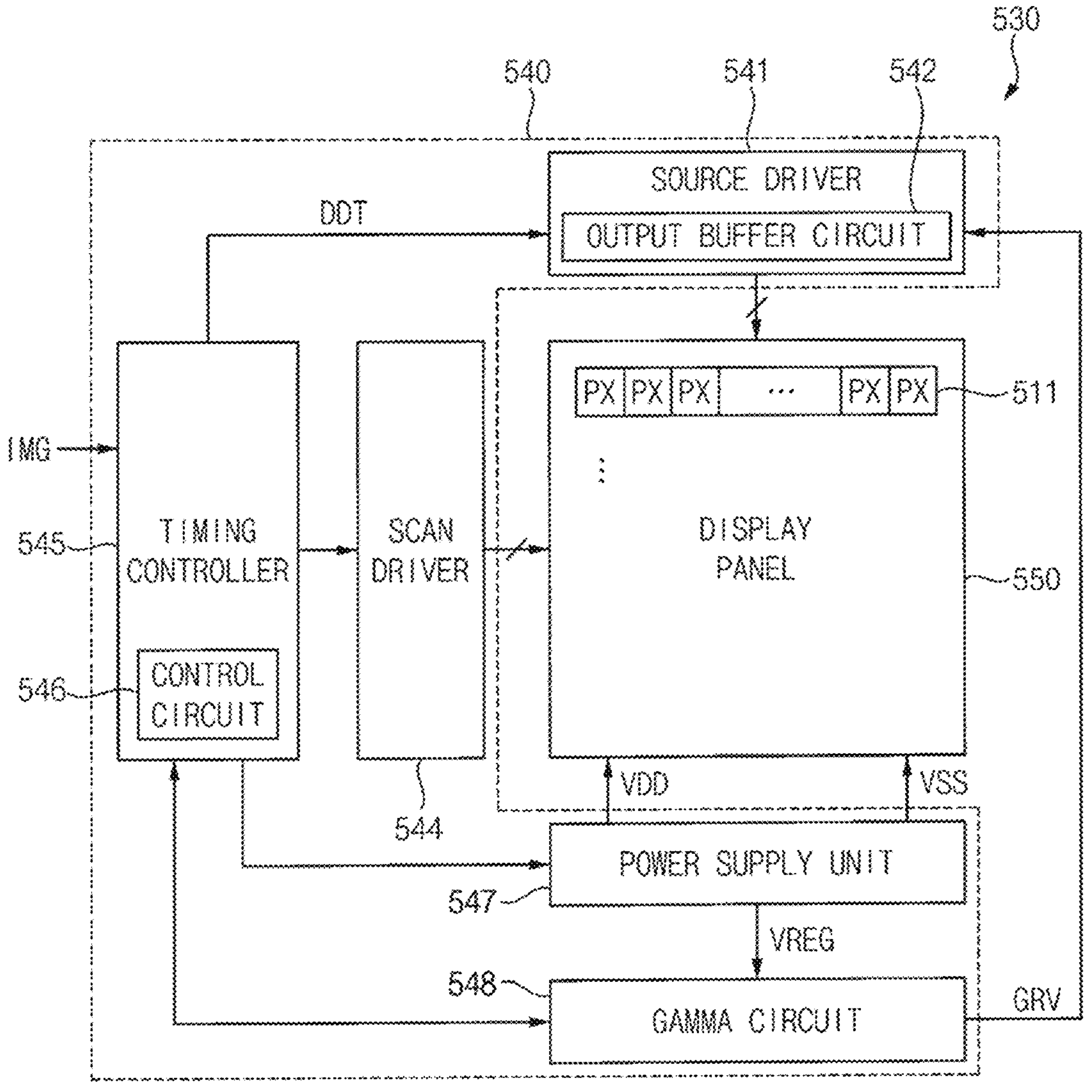
FIG. 24 is a block diagram illustrating a display device including a display driver integrated circuit according to example embodiments.

FIG. 24 is a block diagram illustrating a display device including a display driver integrated circuit according to example embodiments.

Referring to FIG. 24, a display device 530 may include a display panel 550 including a plurality of pixel rows 511 and a display driver integrated circuit (DDI) 540 driving the display panel 550.

The DDI 540 may include a data driver or a source driver 541, a scan driver 544, a timing controller 545, a power supply unit 547, and a gamma circuit 548.

The display panel 550 may be connected to the source driver 541 of the DDI 540 through a plurality of source lines, and may be connected to the scan driver 544 of the DDI 540 through a plurality of scan lines.

The display panel 550 may include the pixel rows 511. The display panel 550 may include a plurality of pixels PX arranged in a matrix having a plurality of rows and a plurality of columns. One row of pixels PX connected to a same scan line may be referred to as one pixel row 511.

In some example embodiments, the display panel 550 may be a self-emitting display panel that emits light without a use of a back light unit. For example, the display panel 550 may be an organic light emitting diode (OLED) display panel.

Each pixel PX included in the display panel 550 may have various configurations according to a driving scheme of the display device 530. For example, the display device 530 may be driven with an analog or a digital driving scheme. While the analog driving scheme produces grayscale using variable voltage levels corresponding to input data, the digital driving scheme produces grayscale using variable time duration in which the OLED emits light. The analog driving scheme may present challenges in that the analog driving scheme may use a DDI that is complicated to manufacture if the display is large and has high resolution. The digital driving scheme, on the other hand, may readily accomplish high resolution through a simpler circuit structure. As the size of the display panel becomes larger and the resolution increases, the digital driving scheme may have more favorable characteristics over the analog driving scheme. The display device according to example embodiments may be applied to both of the analog driving scheme and the digital driving scheme.

The source driver 541 may apply data signal to the display panel 550 through the source lines based on display data DDT.

The scan driver 544 may apply scan signals to the display panel 550 through the scan lines.

The timing controller 545 may control operations of the display device 530. The timing controller 545 may provide predetermined control signals to the source driver 541 and the scan driver 544 to control operations of the display device 530.

In some example embodiments, the source driver 541, the scan driver 544, and the timing controller 545 may be implemented as one integrated circuit (IC). In other embodiments, the source driver 541, the scan driver 544, and the timing controller 545 may be implemented as two or more integrated circuits. A driving module including at least the timing controller 545 and the source driver 541 may be referred to as a timing controller embedded data driver (TED).

The timing controller 545 may receive image data IMG and input control signals from external host device. For example, the image data IMG may include red (R) image data, green (G) image data, and blue (B) image data. According to example embodiments, the image data IMG may include white image data, magenta image data, yellow image data, cyan image data, and so on. The input control signals may include a master clock signal, a data enable signal, a horizontal synchronization signal, a vertical synchronization signal, and so on.

The power supply unit 547 may supply the display panel 550 with a high power supply voltage ELVDD and a low power supply voltage ELVSS. In addition, the power supply unit 547 may supply a regulator voltage VREG to the gamma circuit 548.

The gamma circuit 548 may generate gamma reference voltages GRV based on the regulator voltage VREG. For example, the regulator voltage VREG may be the high power supply voltage ELVDD or another voltage that is generated based on the high power supply voltage ELVDD.

The timing controller 545 may include a control circuit 546, and the source driver 541 may include an output buffer circuit 542. In some example embodiments, the control circuit 546 may be control circuits 100 and 100a described above with reference to FIGS. 1, 4 and 20, and the output buffer circuit 542 may be the output buffer circuit 310 described above with reference to FIG. 1.

As described above, the display driver integrated circuit according to example embodiments may operate in different driving modes, and thus turn off a portion of transistors included in input stage of each of a plurality of buffer circuits when it is not intended to drive a display panel to maximum. Accordingly, power consumption in the display driver integrated circuit may be adaptively reduced.

The display driver integrated circuit may generate a mode determination signal in a digital circuit. A control circuit, a shift register unit, and a data latch unit may correspond to the digital circuit, and a gamma circuit, a digital-to-analog converter, and an output buffer circuit may correspond to an analog circuit. Accordingly, power consumption in the display driver integrated circuit may be effectively reduced regardless of whether the analog circuit of the display device is changed according to a hardware specification stated by a manufacturer of the display device.

Some example embodiments may provide an apparatus and a method for a display system, capable of reducing power consumption of a display driver integrated circuit.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display driver integrated circuit, comprising:

a gamma circuit configured to generate a plurality of gamma voltages based on gamma control information, a first gamma power supply voltage, and a second gamma power supply voltage;

a control circuit configured to calculate a gamma limit value based on panel brightness information, voltage levels of the first and second gamma power supply voltages, and a number of the plurality of gamma voltages, and configured to compare the gamma limit value with a mode determination reference value to generate a mode determination signal representing one of a first driving mode and a second driving mode; and an output buffer circuit including a plurality of buffer circuits that provide analog image signals to a plurality of pixels included in a display panel, each of the plurality of buffer circuits including an input stage, an amplification stage, and an output stage, and the input stage including first transistors having a first type and second transistors having a second type, wherein, in the first driving mode, each of the plurality of buffer circuits is configured to turn off the first transistors included in the input stage, and configured to turn on the second transistors included in the input stage, wherein, in the second driving mode, each of the plurality of buffer circuits is configured to turn on the first transistors and the second transistors included in the input stage, wherein, the gamma limit value includes a first limit value, and the mode determination reference value includes a first mode determination reference value, and wherein, the control circuit is configured to generate the mode determination signal representing the first driving mode in response to the first limit value being higher than the first mode determination reference value.

2. The display driver integrated circuit as claimed in claim 1, wherein:

the first limit value corresponds to a minimum gamma voltage having a lowest voltage level among the plurality of gamma voltages, and the control circuit is configured to generate the mode determination signal representing the second driving mode in response to the first limit value being lower than or equal to the first mode determination reference value.

3. The display driver integrated circuit as claimed in claim 2, wherein:

the first transistors are p-type metal oxide semiconductor transistors, and the second transistors are n-type metal oxide semiconductor transistors.

4. The display driver integrated circuit as claimed in claim 1, wherein:

the gamma limit value includes a second limit value corresponding to a maximum gamma voltage having a highest voltage level among the plurality of gamma voltages, the mode determination reference value includes a second mode determination reference value, and the control circuit is configured to generate the mode determination signal representing the first driving mode in response to the second limit value being lower than the second mode determination reference value, and configured to generate the mode determination signal representing the second driving mode in response to the second limit value being higher than or equal to the second mode determination reference value.

5. The display driver integrated circuit as claimed in claim 4, wherein:

the first transistors are n-type metal oxide semiconductor transistors, and the second transistors are p-type metal oxide semiconductor transistors.

6. The display driver integrated circuit as claimed in claim 1, wherein:

the control circuit is configured to generate the mode determination signal by additionally comparing a third limit value corresponding to a maximum grayscale value of a current frame of the display panel with the first mode determination reference value.

7. The display driver integrated circuit as claimed in claim 6, wherein the control circuit is configured to:

generate the mode determination signal representing the first driving mode in response to the first limit value being higher than the first mode determination reference value, generate the mode determination signal representing the first driving mode in response to the first limit value being lower than or equal to the first mode determination reference value and the third limit value being higher than the first mode determination reference value, and generate the mode determination signal representing the second driving mode in response to the first limit value being lower than or equal to the first mode determination reference value and the third limit value being lower than or equal to the first mode determination reference value.

8. The display driver integrated circuit as claimed in claim 1, wherein:

the gamma limit value includes a second limit value corresponding to a maximum gamma voltage having a highest voltage level among the plurality of gamma voltages, the mode determination reference value includes a second mode determination reference value, and the control circuit is configured to generate the mode determination signal by additionally comparing a fourth limit value corresponding to a minimum gray-scale value of a current frame of the display panel with the second mode determination reference value.

9. The display driver integrated circuit as claimed in claim 8, wherein the control circuit is configured to:

generate the mode determination signal representing the first driving mode in response to the second limit value being lower than the second mode determination reference value, generate the mode determination signal representing the first driving mode in response to the second limit value being higher than or equal to the second mode determination reference value and the fourth limit value being lower than the second mode determination reference value, and generate the mode determination signal representing the second driving mode in response to the second limit value being higher than or equal to the second mode determination reference value and the fourth limit value being higher than or equal to the second mode determination reference value.

10. The display driver integrated circuit as claimed in claim 1, wherein the control circuit includes:

a register configured to provide the mode determination reference value;

a calculation circuit configured to determine a first ratio using the panel brightness information and the number of the plurality of gamma voltages, and configured to calculate the gamma limit value between the first gamma power supply voltage and the second gamma power supply voltage based on the first ratio; and a comparison circuit configured to compare the gamma limit value with the mode determination reference value to generate the mode determination signal.

11. The display driver integrated circuit as claimed in claim 1, wherein the input stage includes:

a first input unit including p-type metal oxide semiconductor transistors;

a second input unit including n-type metal oxide semiconductor transistors;

a first bias unit including a first bias transistor that supplies a first bias current to the first input unit;

a second bias unit including a second bias transistor that supplies a second bias current to the second input unit; and a mode change unit configured to, in the first driving mode, block supply of one of the first bias current and the second bias current.

12. The display driver integrated circuit as claimed in claim 11, wherein the mode change unit includes at least one of:

a first mode change transistor connected to a gate of the first bias transistor, or a second mode change transistor connected to a gate of the second bias transistor.

13. The display driver integrated circuit as claimed in claim 12, wherein the mode change unit is configured to, in the first driving mode, turn off the first mode change transistor and turn on the second mode change transistor in response to the gamma limit value corresponding to a minimum gamma voltage having a lowest voltage level among the plurality of gamma voltages.

14. The display driver integrated circuit as claimed in claim 12, wherein the mode change unit is configured to, in the first driving mode, turn off the second mode change transistor and turn on the first mode change transistor in response to the gamma limit value corresponding to a maximum gamma voltage having a highest voltage level among the plurality of gamma voltages.

15. The display driver integrated circuit as claimed in claim 1, wherein the panel brightness information is input by controlling a brightness adjustment unit of a status bar displayed on a display screen during an operation of the display panel.

16. The display driver integrated circuit as claimed in claim 1, wherein the mode determination signal is generated in units of frames in which the display panel operates.

17. A method of operating a display driver integrated circuit, the method comprising:

generating a plurality of gamma voltages based on gamma control information, a first gamma power supply voltage, and a second gamma power supply voltage;

calculating a gamma limit value based on panel brightness information, voltage levels of the first and second gamma power supply voltages, and a number of the plurality of gamma voltages;

comparing the gamma limit value with a mode determination reference value to generate a mode determination signal representing one of a first driving mode and a second driving mode;

turning off, by each of a plurality of buffer circuits, first transistors included in an input stage and turning on second transistors included in the input stage in the first driving mode, each of the plurality of buffer circuits including the input stage, an amplification stage, and an output stage, and the input stage including the first transistors having a first type and the second transistors having a second type; and turning on, by each of the plurality of buffer circuits, the first transistors and the second transistors included in the input stage in the second driving mode, wherein the gamma limit value includes a first limit value, and the mode determination reference value includes a first mode determination reference value, and wherein the generating the mode determination signal includes:

comparing the first limit value with the first mode determination reference value; and generating the mode determination signal representing the first driving mode in response to the first limit value being higher than the first mode determination reference value.

18. The method as claimed in claim 17, wherein:

the first limit value corresponds to a minimum gamma voltage having a lowest voltage level among the plurality of gamma voltages, and the generating the mode determination signal includes generating the mode determination signal representing the second driving mode in response to the first limit value being lower than or equal to the first mode determination reference value.

19. The method as claimed in claim 17, wherein:
the gamma limit value includes a second limit value corresponding to a maximum gamma voltage having a highest voltage level among the plurality of gamma voltages,
the mode determination reference value includes a second mode determination reference value, and
the generating the mode determination signal includes:
comparing the second limit value with the second mode determination reference value;
generating the mode determination signal representing the first driving mode in response to the second limit value being lower than the second mode determination reference value; and
generating the mode determination signal representing the second driving mode in response to the second limit value being higher than or equal to the second mode determination reference value.

20. A display driver integrated circuit, comprising:
a gamma circuit configured to generate a plurality of gamma voltages based on gamma control information, a first gamma power supply voltage, and a second gamma power supply voltage;
a control circuit configured to calculate a gamma limit value based on panel brightness information, voltage levels of the first and second gamma power supply voltages, and a number of the plurality of gamma voltages, and configured to compare the gamma limit value with a mode determination reference value to generate a mode determination signal representing one of a first driving mode and a second driving mode; and
an output buffer circuit including a plurality of buffer circuits that provide analog image signals to a plurality of pixels included in a display panel, wherein each of the plurality of buffer circuits includes an input stage, an amplification stage and an output stage, and the input stage includes first transistors having a first type and second transistors having a second type,
wherein the input stage includes:
a first input unit including p-type metal oxide semiconductor transistors;
a second input unit including n-type metal oxide semiconductor transistors;
a first bias unit including a first bias transistor that supplies a first bias current to the first input unit;
a second bias unit including a second bias transistor that supplies a second bias current to the second input unit; and
a mode change unit including at least one of a first mode change transistor connected to a gate of the first bias transistor and a second mode transistor connected to a gate of the second bias transistor, and configured to, in the first driving mode, block supply of one of the first bias current and the second bias current,
wherein, in the first driving mode, each of the plurality of buffer circuits is configured to turn off one of the first and second mode change transistors to turn off one of the first and second input units and turn on the other of the first and second input units, and
wherein, in the second driving mode, each of the plurality of buffer circuits is configured to turn on at least one of the first and second mode change transistors to turn on both of the first and second input units,
wherein, the gamma limit value includes a first limit value, and the mode determination reference value includes a first mode determination reference value, and
wherein, the control circuit is configured to generate the mode determination signal representing the first driving mode in response to the first limit value being higher than the first mode determination reference value.

* * * * *